(12) United States Patent
Yang et al.

(10) Patent No.: US 10,750,305 B2
(45) Date of Patent: Aug. 18, 2020

(54) METHOD FOR PROCESSING VR AUDIO AND CORRESPONDING EQUIPMENT

(71) Applicant: Samsung Electronics Co., Ltd., Suwon-si, Gyeonggi-do (KR)

(72) Inventors: Lei Yang, Beijing (CN); Li Liu, Beijing (CN); Lizhong Wang, Beijing (CN); Changtao Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/879,901

(22) Filed: Jan. 25, 2018

(65) Prior Publication Data

US 2018/0213341 A1 Jul. 26, 2018

(30) Foreign Application Priority Data

Jan. 25, 2017 (CN) .......................... 2017 1 0056192

(51) Int. Cl.
*H04S 7/00* (2006.01)
*H04S 3/00* (2006.01)
(Continued)

(52) U.S. Cl.
CPC .............. *H04S 3/004* (2013.01); *G06F 3/011* (2013.01); *G06F 3/012* (2013.01); *G06T 19/003* (2013.01);
(Continued)

(58) Field of Classification Search
CPC ............ H04S 2400/15; H04S 2420/11; H04S 2420/01; H04S 7/302; H04S 7/303; H04S 7/304
See application file for complete search history.

(56) References Cited

U.S. PATENT DOCUMENTS 9,979,829 B2 * 5/2018 Cartwright ............ H04M 3/568
2016/0104495 A1 4/2016 Peters et al.
(Continued)

FOREIGN PATENT DOCUMENTS

CN 105376690 A 3/2016
WO 2015/192117 A1 12/2015
(Continued)

OTHER PUBLICATIONS

Hollerweger, An Introduction to Higher Order Ambisonic, Oct. 2008, (http://flo.mur.at/writings/HOA-intro.pdf) See section 1.3.1; and section 2.2.
(Continued)

*Primary Examiner* — Kile O Blair
(74) *Attorney, Agent, or Firm* — Jefferson IP Law, LLP

(57) ABSTRACT

A method for processing a virtual reality (VR) audio and a corresponding equipment are provided. The method includes acquiring, by a transmitting terminal of a VR audio, an ambisonics signal rotation angle, wherein the ambisonics signal rotation angle is determined according to a first equipment rotation angle corresponding to a receiving terminal of the VR audio, rotating an ambisonics signal according to the acquired ambisonics signal rotation angle, and/or, acquiring, by the transmitting terminal of the VR audio, an order of a mixed order ambisonics (MOA) signal determined according to related information of the VR audio, and extracting an MOA signal from the ambisonics signal according to the order of the MOA signal. Accordingly, an ambisonics signal rotation angle according to a rotation angle of an equipment is determined, the rotation occurs, and an MOA signal is extracted.

15 Claims, 19 Drawing Sheets

(51) Int. Cl.
  *G06F 3/01* (2006.01)
  *G06T 19/00* (2011.01)
  *H04R 5/04* (2006.01)

(52) U.S. Cl.
  CPC ............. *H04S 7/304* (2013.01); *H04R 5/04* (2013.01); *H04R 2201/401* (2013.01); *H04R 2430/21* (2013.01); *H04R 2460/07* (2013.01); *H04S 2400/11* (2013.01); *H04S 2400/15* (2013.01); *H04S 2420/01* (2013.01); *H04S 2420/11* (2013.01)

(56) References Cited

U.S. PATENT DOCUMENTS

| | | |
|---|---|---|
| 2016/0227340 A1 | 8/2016 | Peters |
| 2016/0241980 A1 | 8/2016 | Najaf-Zadeh et al. |
| 2016/0295341 A1 | 10/2016 | Mentz |
| 2017/0295446 A1* | 10/2017 | Thagadur Shivappa ............... G06F 3/011 |

FOREIGN PATENT DOCUMENTS

| | | |
|---|---|---|
| WO | 2017/176375 A1 | 10/2017 |
| WO | 2019/067445 A1 | 4/2019 |

OTHER PUBLICATIONS

Lavelle; The Latent Power of Prediction; Oculus VR, LLC; XP 055255279; Jul. 12, 2013.

Hess; Head-Tracking Techniques for Virtual Acoustics Applications; Audio Engineering Society; Convention Paper 8782; 133rd Convention; XP 00574833; Oct. 26-29; San Francisco, CA.

European Search Report dated Jan. 23, 2020; European Appln. No. 18744776.8-1207 / 3569001 PCT/KR2018001140.

* cited by examiner

METHOD FOR PROCESSING VR AUDIO AND CORRESPONDING EQUIPMENT

CROSS-REFERENCE TO RELATED APPLICATION(S)

This application is based on and claims priority under 35 U.S.C. § 119 to Chinese Patent Application No. 201710056192.1, filed on Jan. 25, 2017 in the State Intellectual Property Office of the People's Republic of China, the disclosure of which is incorporated by reference herein in its entirety.

TECHNICAL FIELD

The disclosure relates to the technical field of virtual reality (VR) audios. More particularly, the disclosure relates to a method for processing a VR audio and a corresponding equipment.

BACKGROUND

As people pay more attention to virtual reality (VR) products, many companies and organizations focus on the development of VR technologies. The VR audio is a key technology in the VR field. The VR audio can provide a user with auditory contents having a spatial resolution, so that the user can have immersive VR application experience. The sense of immersion can be realized only if both the visual sense and the auditory sense are consistent with the real world, as shown in FIG. 1.

FIG. 1 is a schematic diagram of experience of a virtual reality (VR) audio according to the related art.

The VR content source is an issue concerned by many users at present. To enable a user to experience rich VR applications and VR contents, an online virtual content platform becomes a future development trend, and a user can use a VR equipment to browse VR contents on the online virtual content platform in real time. However, the bandwidth use in the browsing process is an issue to be considered.

As one key technology in the existing VR audio, the ambisonics technology records and restores a physical sound field by sound field harmonic decomposition and successive approximation. Ambisonics uses spatial harmonics as independent signals. For L-order spatial ambisonics, $(L+1)^2$ independent spatial harmonic signals are required, an array consisting of $(L+1)^2$ microphones is at least required for pickup, and at least $(L+1)^2$ loudspeakers are required for playback. If the order of an ambisonics signal is higher, the approximation effect of the spatial sound field is better. Therefore, a higher-order ambisonics signal has a better spatial resolution. However, the bandwidth occupancy sharply increases with the increase of the order.

FIG. 2 is a schematic diagram of the spatial resolution of ambisonics sound fields of different orders according to the related art.

FIG. 3A is a schematic diagram of a 3-order ambisonics sound field, where 16 independent signals are required, according to the related art.

To solve the problem in the ambisonics technology that the bandwidth occupancy sharply increases with the increase of the order, a mixed order ambisonics (MOA) technology has been proposed. In the MOA technology, different orders are used for sound fields in a horizontal direction and a vertical direction. When a user gazes at a horizontal plane, the ears are differently sensitive to the sound in the horizontal direction and the sound in the vertical direction, and are more sensitive to the sound in the horizontal direction. Therefore, contents in the horizontal direction are transmitted at a higher order so that the contents in the horizontal direction have a high spatial resolution, meanwhile, contents in the vertical direction are transmitted at a low order, thereby reducing the bandwidth occupancy.

FIG. 3B is a schematic diagram of an MOA sound field according to the related art.

Referring to FIG. 3B, the horizontal direction is at a 3-order (a 3-order two-dimensional ambisonic signal is used in the horizontal direction), the vertical direction is at a 1-order (a 1-order three-dimensional ambisonic signal is used in the vertical direction). When the MOA technology is used, only 8 independent signals are required, and the bandwidth occupancy is equivalent to ½ of that for the ambisonics technology.

However, the existing MOA technology is still not high enough in the spatial resolution accuracy but too high in the bandwidth occupancy.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for processing a virtual reality (VR) audio and a corresponding equipment.

In accordance with an aspect of the disclosure, a method for processing a VR audio is provided. The method includes acquiring, by a transmitting terminal of a VR audio, an ambisonics signal rotation angle, determining the ambisonics signal rotation angle according to a first equipment rotation angle corresponding to a receiving terminal of the VR audio, and rotating an ambisonics signal according to the acquired ambisonics signal rotation angle.

In accordance with another aspect of the disclosure, a transmitting terminal equipment for a VR audio is provided. The transmitting terminal equipment includes an acquisition device configured to acquire an ambisonics signal rotation angle, the ambisonics signal rotation angle being determined according to a first equipment rotation angle corresponding to a receiving terminal of the VR audio, and a rotation device configured to rotate an ambisonics signal according to the ambisonics signal rotation angle.

In accordance with another aspect of the disclosure, a method for processing a VR audio is provided. The method includes acquiring, by a receiving terminal of a VR audio, a corresponding first equipment rotation angle, transmitting the acquired first equipment rotation angle to a transmitting terminal of the VR audio, and/or predicting a second equipment rotation angle according to the corresponding first equipment rotation angle and current network delay information, and transmitting the second equipment rotation angle to the transmitting terminal of the VR audio.

In accordance with another aspect of the disclosure, a receiving terminal equipment for a VR audio is provided. The received terminal equipment includes an acquisition device configured to acquire a corresponding first equipment rotation angle, and at least one processor configured to transmit the acquired first equipment rotation angle to a transmitting terminal of a VR audio, and/or predict a second equipment rotation angle according to the first equipment rotation angle and current network delay information and transmit the second equipment rotation angle to the transmitting terminal of the VR audio.

In accordance with another aspect of the disclosure, a method for processing a VR audio is provided. The method includes acquiring, by a transmitting terminal of a VR audio, an order of a mixed order ambisonics (MOA) signal determined according to related information of the VR audio, the related information comprising at least one of content-related information of the VR audio, playback-related information of the VR audio, and transmission-related information of the VR audio, and extracting, by the transmitting terminal of the VR audio, an MOA signal from an ambisonics signal according to the order of the MOA signal.

In accordance with another aspect of the disclosure, a transmitting terminal equipment for a VR audio is provided. The transmitting terminal equipment includes an acquisition device configured to acquire an order of a mixed-order ambisonics (MOA) signal determined according to related information of the VR audio, the related information comprising at least one of the following, content-related information of the VR audio, playback-related information of the VR audio, and transmission-related information of the VR audio, and an extraction device configured to extract an MOA signal from an ambisonics signal according to the order of the MOA signal.

In accordance with another aspect of the disclosure, a method for processing a VR audio is provided. The method includes acquiring, by a receiving terminal of a VR audio, related information of the VR audio, the related information comprising at least one of content-related information of the VR audio, playback-related information of the VR audio, and transmission-related information of the VR audio, and by the receiving terminal of the VR audio, transmitting the acquired related information of the VR audio to a transmitting terminal of the VR audio, or determining an order of an MOA signal according to the acquired related information of the VR audio and transmitting the determined order of the MOA signal to the transmitting terminal of the VR audio.

Another aspect of the disclosure is to provide another receiving terminal equipment for a VR audio, comprising an acquisition device configured to acquire related information of a VR audio, the related information comprising at least one of content-related information of the VR audio, playback-related information of the VR audio, and transmission-related information of the VR audio, and at least one processor configured to transmit the acquired related information of the VR audio to a transmitting terminal of the VR audio, or determine an order of an MOA signal according to the acquired related information of the VR audio and transmit the determined order of the MOA signal to the transmitting terminal of the VR audio.

Compared with the prior art, in the method for processing a VR audio and the corresponding equipment provided by the disclosure, an ambisonics signal rotation angle can be determined according to a change in the equipment rotation angle corresponding to a receiving terminal of the VR audio, and an ambisonics is then rotated, so that a terminal equipment playing VR audio contents or a terminal equipment playing VR video contents can still have a very high spatial audio resolution when it is not placed horizontally.

In addition, in the technical solutions of the disclosure, an order of an MOA signal determined according to related information of the VR audio can be acquired, and an MOA signal can be extracted according to the order of the MOA signal, so that the accuracy of the spatial resolution can be improved and/or the bandwidth occupancy can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following descriptions taken in conjunction with the accompanying drawings, in which.

Throughout the drawings, it should be noted that like reference numbers are used to depict the same or similar elements, features, and structures.

DETAILED DESCRIPTION

Figure 1:
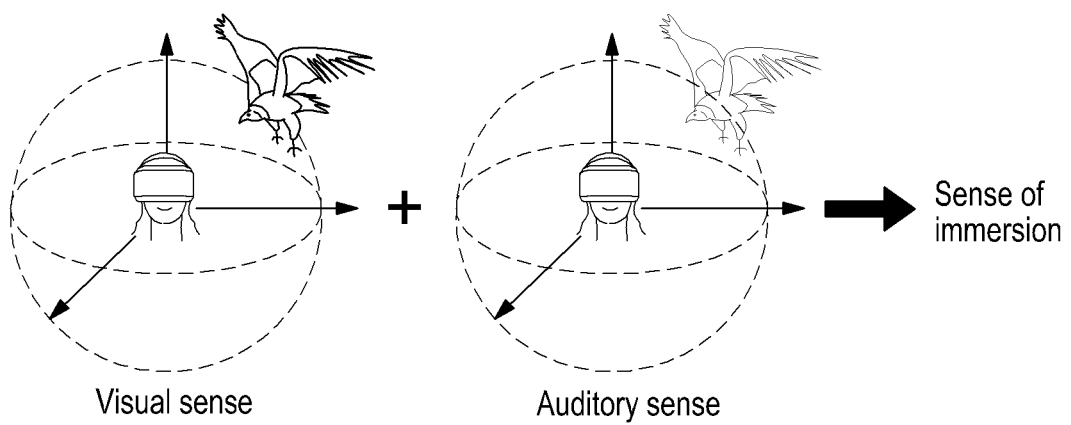
FIG. 1 is a schematic diagram of experience of a virtual reality (VR) audio according to the related art.
Figure 2:
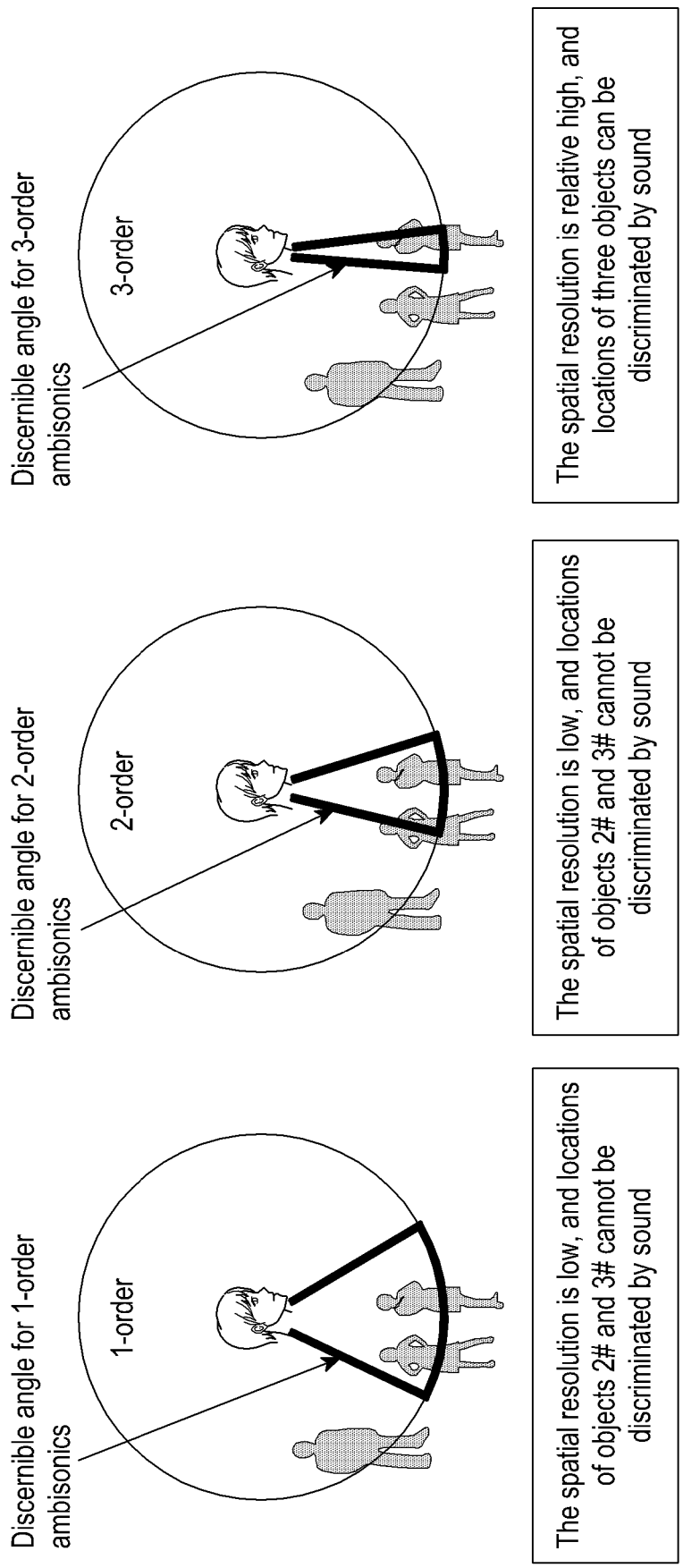
FIG. 2 is a schematic diagram of the spatial resolution of ambisonics sound fields with different orders according to the related art.
Figure 3A:
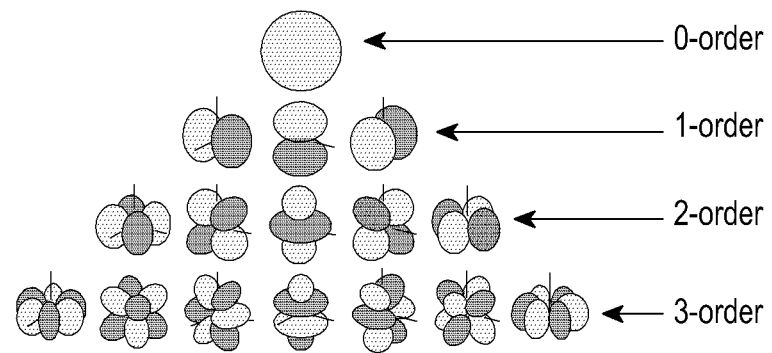
FIG. 3A is a schematic diagram of an ambisonics sound field according to the related art.
Figure 3B:
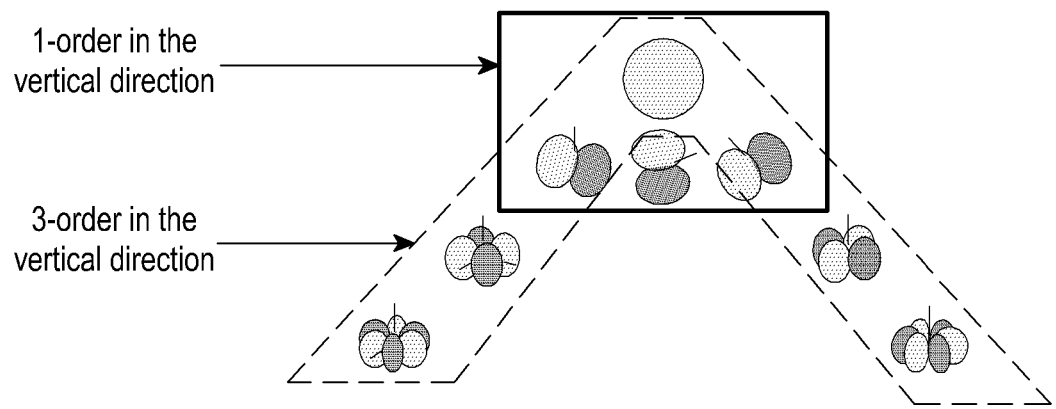
FIG. 3B is a schematic diagram of a mixed-order ambisonics (MOA) sound field according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; personal communication systems (PCSs) with combined functionalities of speech, data processing, facsimile and/or data communication; personal digital assistants (PDAs), which may include radio frequency (RF) receivers, pagers, internet networks/intranet accesses, web browsers, notepads, calendars and/or global positioning system (GPS) receivers; and/or laptop of the related art and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a mobile Internet device (MID) and/or a mobile phone with a music/video playback function, or can be equipment such as a smart television (TV) and a set-top box.

Embodiment 1

Figure 4:
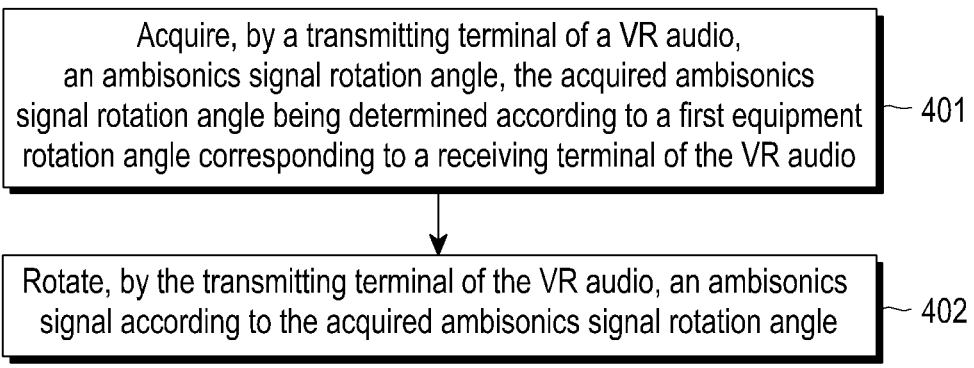
FIG. 4 is a schematic flowchart of a method for processing a VR audio according to an embodiment of the disclosure.

This embodiment of the disclosure provides a method for processing a virtual reality (VR) audio, comprising the following steps, as shown in FIG. 4.

FIG. 4 is a schematic flowchart of a method for processing a VR audio according to an embodiment of the disclosure.

Referring to FIG. 4, at operation 401, a transmitting terminal of a VR audio acquires an ambisonics signal rotation angle, the acquired ambisonics signal rotation angle being determined according to a first equipment rotation angle corresponding to a receiving terminal of the VR audio.

In the Embodiment 1 of the disclosure, the receiving terminal of the VR audio is a terminal equipment receiving VR audio contents. The receiving terminal of the VR audio can comprise a head mount display (HMD) equipment and/or an earphone equipment capable of playing a stereo audio.

The receiving terminal of the VR audio can receive only the VR audio contents, and then render and play the received VR audio contents for a user. Furthermore, in addition to receive the VR audio contents, the receiving terminal of the VR audio can further receive VR video contents corresponding to the VR audio contents, and synchronously play the VR audio contents and the VR video contents for a user.

The transmitting terminal of the VR audio is an equipment transmitting the VR audio contents. The transmitting terminal of the VR audio can be a server having the VR audio contents stored therein, or can be a terminal equipment which is different from the receiving terminal of the VR audio and has the VR audio contents stored therein.

There can be wired connection or wireless connection between the transmitting terminal equipment and the receiving terminal equipment.

The wireless connection can be at least one of the following connection modes: Bluetooth, ultra-wideband, ZigBee, Wireless Fidelity (WiFi) network, general packet radio service (GPRS) network, 3rd-generation wireless telephone technology (3G) network, long-term evolution (LTE) network, or more.

In the Embodiment 1 of the disclosure, the first equipment rotation angle corresponding to the receiving terminal of the VR audio can be an equipment rotation angle of a terminal equipment playing the VR audio contents (e.g., a rotation angle of an earphone equipment capable of playing a stereo audio), or an equipment rotation angle of a terminal equipment playing the VR video contents corresponding to the VR audio contents (e.g., an equipment rotation angle of an HMD equipment worn by the user).

The first equipment rotation angle can be measured by a sensor (e.g., an inertia measurement unit). For example, the rotation angle information can be obtained according to a result of measurement of the inertia measurement unit. The first equipment rotation angle can also be obtained by analyzing and calculating images shot by a camera device of the equipment. The first equipment rotation angle can be an absolute value, or a variable value with respect to an initial angle after system initialization. If a variable value with respect to the initial angle is used as the first equipment rotation angle, the initial angle can be an absolute value, and this value can be transmitted to the transmitting terminal of the VR audio, so that the transmitting terminal of the VR audio obtains the first equipment rotation angle according to the initial angle. Wherein, an angle measured when the equipment (the terminal equipment playing the VR audio contents or the terminal equipment playing the corresponding VR video contents) is placed horizontally can be used as the initial angle after system initialization.

Figure 5:
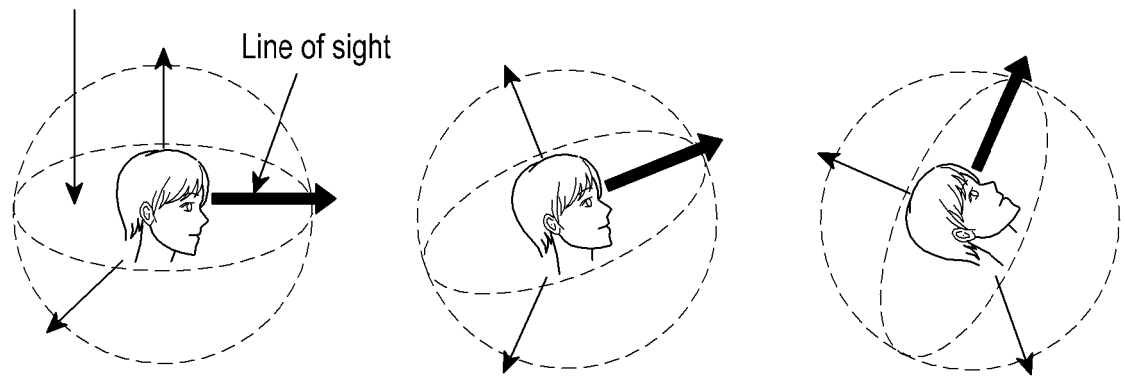
FIG. 5 is a schematic diagram of a gazing plane of a user according to an embodiment of the disclosure.

FIG. 5 is a schematic diagram of a gazing plane of a user according to an embodiment of the disclosure.

Referring to FIG. 5, in the Embodiment 1 of the disclosure, the first equipment rotation angle indicates a rotation angle of a gazing plane when the user listens to the VR audio contents (at this time, the user can also synchronously watch the VR video contents corresponding to the VR audio contents). As shown in FIG. 5, when the user stands upright normally, a plane determined by a straight line to which the line of sight the eyes of the user gaze corresponds and a straight line that passes the user's eyes can be called a gazing plane, or a plane which is parallel to the aforesaid plane and passes both ears can be called as a gazing plane. The specific setting to be used depends upon the practical situation. As shown in FIG. 5, when the user turns his/her head, the gazing plane of the user will also change, accordingly.

Figure 6:
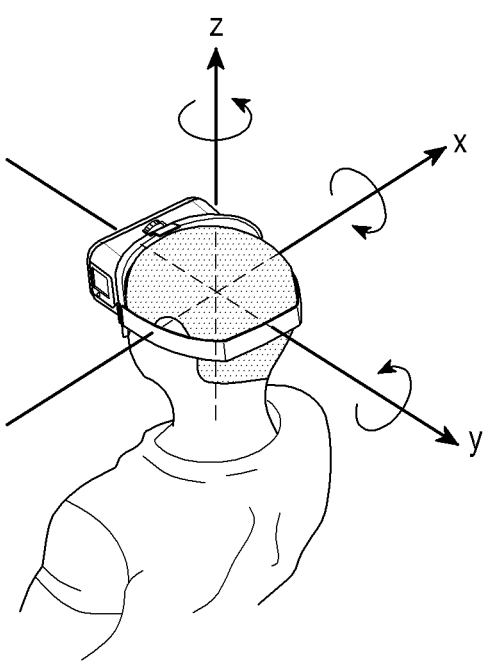
FIG. 6 is a schematic diagram of a rotation angle of the gazing plane of the user according to an embodiment of the disclosure.

FIG. 6 is a schematic diagram of a rotation angle of the gazing plane of the user according to an embodiment of the disclosure.

Referring to FIG. 6, first equipment rotation angles $\theta$, $\omega$, $\varphi$ are rotation angles of the equipment in the x-axis, y-axis and z-axis, and the x-axis, y-axis and z-axis form a space coordinate system using the user's head as a center. Directions of the x-axis, y-axis and z-axis of ambisonics signals are the same as the directions of those in this coordinate system, as shown in FIG. 6. Wherein, the z-axis refers to a vertical direction, and the x-axis and y-axis are located in the horizontal plane.

In the following description of this embodiment of the disclosure, the rotation angle of the gazing plane of the user is consistent with the equipment rotation angle.

At operation 402, the transmitting terminal of the VR audio rotates an ambisonics signal according to the acquired ambisonics signal rotation angle.

The transmitting terminal of the VR audio extracts a mixed-order ambisonics (MOA) signal from the rotated ambisonics signal, and transmits the MOA signal to the receiving terminal of the VR audio. The receiving terminal of the VR audio renders and plays the received MOA for the user by itself or other connected equipments. Wherein, the order of the MOA signal can be determined by an order determination method in the prior art. For example, the transmitting terminal of the VR audio extracts an MOA signal according to the preset horizontal order and vertical order (for example, horizontal 3-order and vertical 1-order).

The high spatial resolution direction in the existing MOA technology is a fixed horizontal direction and is unable to change with the action of the user's head. When the user raises his/her head or performs other actions, the terminal equipment playing the VR audio contents or the terminal equipment playing the corresponding VR video contents is not placed horizontally, and the gazing plane of the user is not the horizontal plane. Thus, the high-order transmission of contents in the horizontal direction in accordance with the existing MOA technology will reduce the spatial resolution of the sound.

In the method for processing a VR audio provided in Embodiment 1 of the disclosure, an ambisonics signal rotation angle can be determined according to a change in the equipment rotation angle corresponding to the receiving terminal of the VR audio (the change in the equipment rotation angle indicates a change in the rotation angle of the gazing plane of the user), and the ambisonics signal is then rotated, so that a terminal equipment playing VR audio contents or a terminal equipment playing corresponding VR video contents can still have a very high spatial audio resolution when it is not placed horizontally (the gazing plane of the user is not horizontal).

Embodiment 2

Figure 7:
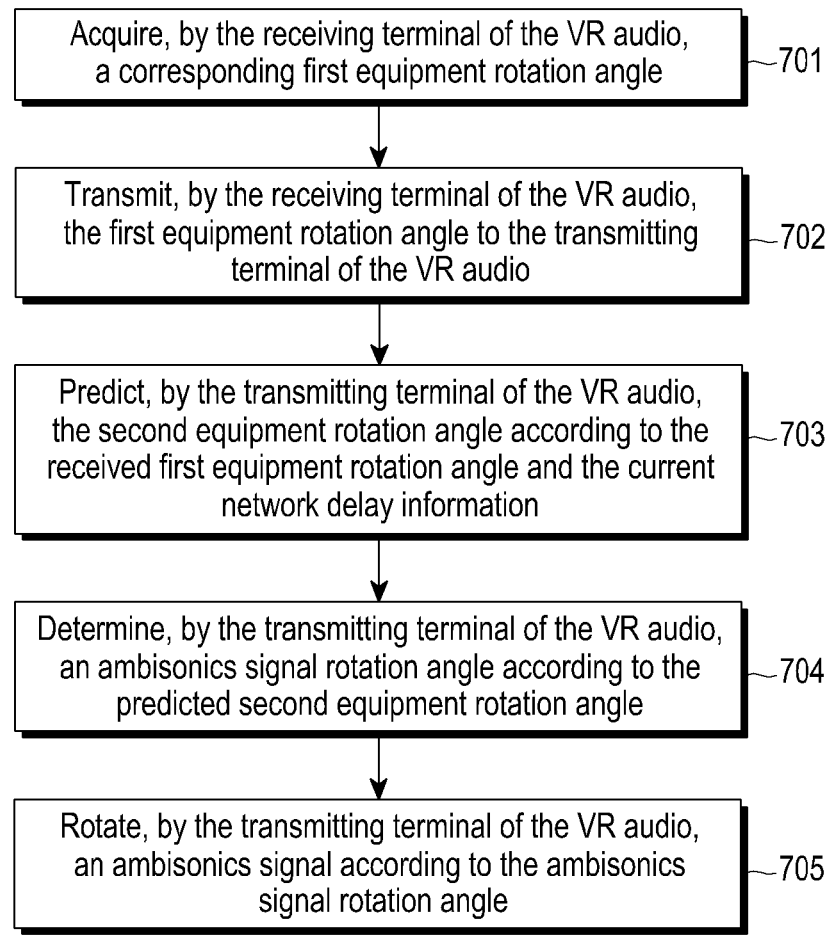
FIG. 7 is a schematic flowchart of another method for processing a VR audio according to an embodiment of the disclosure.

FIG. 7 is a schematic flowchart of another method for processing a VR audio according to an embodiment of the disclosure.

The Embodiment 2 of the disclosure is a possible implementation of the Embodiment 1 of the disclosure. Based on the Embodiment 1 of the disclosure, the receiving terminal of the VR audio can transmit the first equipment rotation angle to the transmitting terminal of the VR audio, and the transmitting terminal determines an ambisonics signal rotation angle according to the first equipment rotation angle. As shown in FIG. 7, this method comprises the following steps.

At operation 701, the receiving terminal of the VR audio acquires a corresponding first equipment rotation angle.

At operation 702, the receiving terminal of the VR audio transmits the first equipment rotation angle to the transmitting terminal of the VR audio.

The receiving terminal of the VR audio can transmit the original data of the first equipment rotation angle to the transmitting terminal of the VR audio. The original data can be rotation angles θ, φ, ω of the equipment in the x-axis, y-axis and z-axis. As required, the receiving terminal of the VR audio can also transmit an angular speed, an angular acceleration or other information to the transmitting terminal of the VR audio. The angular speed, the angular acceleration or other information can be obtained by estimation, or can be obtained by measurement of equipments.

After the transmitting terminal of the VR audio receives the first equipment rotation angle information, and if packet loss occurs, the influence from the packet loss can be reduced by error concealment. The error concealment means that, if the equipment rotation angle data is not received at the current moment due to the network packet loss or error, the data at the current moment is estimated by using the data received at a historical moment. For example, a value at a previous moment is used as the value at the current moment, or the lost equipment rotation angle data is predicted by a prediction algorithm. The error concealment step is an optional step, and can reduce the influence from the network packet loss.

At operation 703, the transmitting terminal of the VR audio predicts a second equipment rotation angle according to the received first equipment rotation angle and current network delay information.

Figure 8:
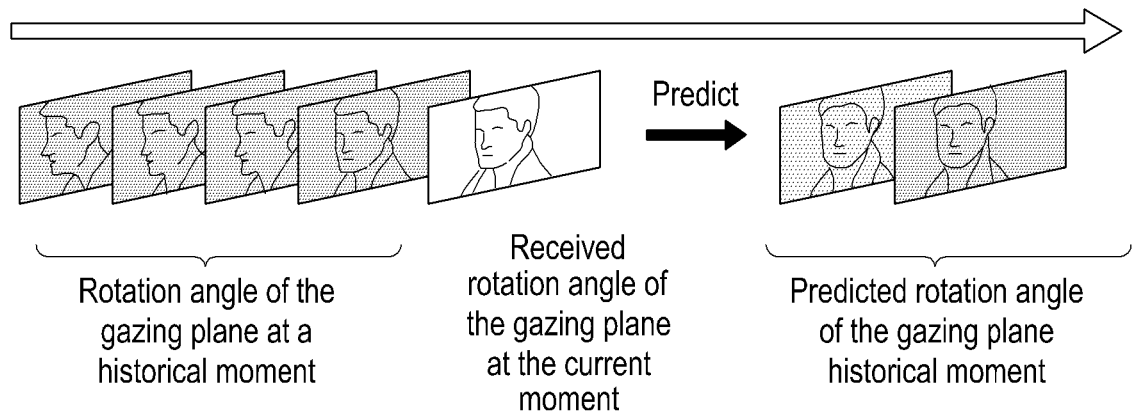
FIG. 8 is a schematic diagram of predicting the rotation angle of the gazing plane of the user according to an embodiment of the disclosure.

FIG. 8 is a schematic diagram of predicting the rotation angle of the gazing plane of the user according to an embodiment of the disclosure.

In this embodiment of the disclosure, if there is the network delay, the first equipment rotation angle (i.e., the rotation angle of the gazing plane) received by the transmitting terminal of the VR audio is different from the equipment rotation angles θ', φ' and ω' at a future moment (after the moment $T_{delay}$). Therefore, it is required to predict the equipment rotation angle, i.e., the second equipment rotation angle, after a preset network delay time (after the moment $T_{delay}$) according to the first equipment rotation angle received at the current moment and the current network delay information, as shown in FIG. 8.

In this embodiment of the disclosure, the network delay $T_{delay}$ can be a sum of the transmission time required for the receiving terminal of the VR audio to transmit the related data to the transmitting terminal of the VR audio and the transmission time required for the transmitting terminal of the VR audio to transmit the related data to the receiving terminal of the VR audio.

Wherein, the transmitting terminal of the VR audio can determine second equipment rotation angles θ', φ' and ω' after the preset network delay time in the following ways.

Way 1: The transmitting terminal of the VR audio can predict θ', φ' and ω' by a predictor, for example, a linear predictor, a Kalman predictor or a Wiener predictor.

Wherein, the linear prediction is as follows: according to $θ_1, θ_2, \ldots θ_p$ (i.e., rotation angles of the gazing plane about the x-axis) among the first equipment rotation angles received at the past p moments, a rotation angle θ' (i.e., a rotation angle of the gazing plane about the x-axis at the current moment) among the first equipment rotation angles at the current moment is predicted. The processing method for φ and ω are the same as that for θ. The prediction formula is as follows:

$$θ' = \sum_{k=1}^{p} β_k θ_k$$

where $β_k$ is a prediction coefficient, and is calculated from historical data; and, the order p of the predictor can be adjusted according to the network delay $T_{delay}$, and the formula thereof is $$p = \frac{T_{delay}}{f_s},$$

where $f_s$ is a sampling frequency of the first equipment rotation angle.

Way 2: If the transmitting terminal of the VR audio can acquire angular speeds $v_θ, v_φ, v_ω$ and angular accelerations $e_θ, e_φ, e_ω$ of the first equipment rotation angle, the first equipment rotation angle after the delay $T_{delay}$ can be calculated in accordance with $$θ' = v_θ T_{delay} + \frac{1}{2} e_θ T_{delay}^2,$$

where $v_θ, v_φ, v_ω$ represent angular speeds of the gazing plane rotating about the x-axis, y-axis and z-axis, respectively, and $e_θ, e_φ, e_ω$ represent angular accelerations of the gazing plane rotating about the x-axis, y-axis and z-axis, respectively. The processing method for φ and ω is the same as that for θ.

In this embodiment of the disclosure, in the operation 703, in the presence of the network delay, the obtained equipment rotation angles and ambisonics signal rotation angles can be closer to real ones, so that the spatial resolution will not be reduced due to the network delay.

At operation 704, the transmitting terminal of the VR audio determines an ambisonics signal rotation angle according to the predicted second equipment rotation angle.

In this embodiment of the disclosure, a reverse angle corresponding to the second equipment rotation angle can be determined as an ambisonics signal rotation angle. For example, if the second equipment rotation angle is rotation angles 9, co, co of the equipment about the x-axis, y-axis and z-axis, the final ambisonics signal rotation angle can be −θ, −φ−ω.

At operation 705, the transmitting terminal of the VR audio rotates an ambisonics signal according to the rotation angle of the ambisonics signal.

In the Embodiment 2 of the disclosure, the transmitting terminal of the VR audio rotates the ambisonics signal according to the obtained rotation angles of the ambisonics signal about the x-axis, y-axis and z-axis, i.e., the rotation angle of the ambisonics signal, so that a very high spatial resolution is still ensured when the gazing plane is not horizontal.

For example, if the ambisonics signal is a 1-order ambisonics signal, four record channel signals of which are W, X, Y and Z, respectively, where W is an omni-directional recording channel signal, and X, Y and Z are directed to the x-axis, y-axis and z-axis, respectively. The rotation formula is as follows:

$$[X'Y'Z']=[XYZ]J$$

where:

$$J = \begin{bmatrix} 1 & 0 & 0 \\ 0 & \cos(-\theta) & -\sin(-\theta) \\ 0 & \sin(-\theta) & \cos(-\theta) \end{bmatrix} \begin{bmatrix} \cos(-\varphi) & 0 & -\sin(-\varphi) \\ 0 & 1 & 0 \\ \sin(-\varphi) & 0 & \cos(-\varphi) \end{bmatrix}$$

$$\begin{bmatrix} \cos(-\omega) & -\sin(-\omega) & 0 \\ \sin(-\omega) & \cos(-\omega) & 0 \\ 0 & 0 & 1 \end{bmatrix}$$

is called a rotation matrix, and X', Y' and Z' are rotated X, Y and Z channel signals.

The transmitting terminal of the VR audio extracts an MOA signal from the rotated ambisonics signal, and transmits the MOA signal to the receiving terminal of the VR audio. The receiving terminal of the VR audio renders and plays the received MOA signal for the user by itself or other connected equipments. Wherein, the order of the MOA signal can be determined by an order determination method in the prior art. For example, the transmitting terminal of the VR audio extracts an MOA signal according to the preset horizontal order and vertical order (for example, horizontal 3-order and vertical 1-order).

Embodiment 3

The Embodiment 3 of the disclosure is another possible implementation of the Embodiment 1 of the disclosure. Based on the Embodiment 2, at least one of operations 702a (not shown) and 703a (not shown) may further be included. The steps will be specifically described below.

At operation 702a, before the operation 702, the receiving terminal of the VR audio performs smoothing on the acquired first equipment rotation angle.

In the Embodiment 3 of the disclosure, the receiving terminal performs smoothing on the first equipment rotation angle to eliminate tiny jitter of the user, and the smoothing can be realized by smooth filtering. Wherein, the smooth filtering can be realized by a low-pass filter.

Figure 9:
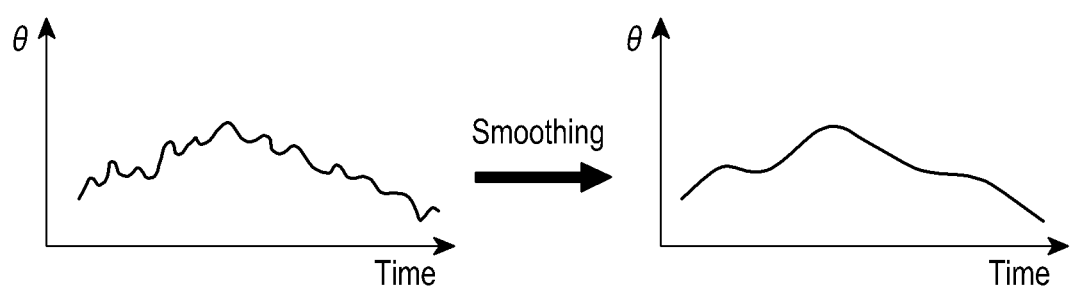
FIG. 9 is a schematic diagram of a result of smooth filtering according to an embodiment of the disclosure.

FIG. 9 is a schematic diagram of a result of smooth filtering according to an embodiment of the disclosure.

In the Embodiment 3 of the disclosure, the smoothed first equipment rotation angle can be determined in accordance with the formula $\hat{\theta}(n)=\Sigma_{k=0}^{K-1}a_k\theta(n-k)$, where $a_k$ is a filter coefficient, for example, K=3, and $a_0=a_1=a_2=\frac{1}{3}$; $\theta(n)$ denotes the rotation angle of the equipment about the x-axis at the moment n; and, $\hat{\theta}(n)$ denotes the smoothed first rotation angle. FIG. 9 shows a schematic diagram of the result, and the processing way for φ and ω can be determined by the above formula.

At this time, at operation 702, the receiving terminal of the VR audio transmits the smoothed first equipment rotation angle to the transmitting terminal of the VR audio. In other words, the first equipment rotation angle received by the transmitting terminal of the VR audio is the smoothed first equipment rotation angle.

In the Embodiment 3 of the disclosure, since the first equipment rotation angle is smoothed, the influence from the jitter noise can be eliminated, so that the accuracy of the subsequently determined ambisonics signal rotation angle can be further improved. When the first equipment rotation angle remains unchanged after the noise is removed, the receiving terminal can omit the step of transmitting the first equipment rotation angle to the transmitting terminal, so that the amount of computation is reduced.

At operation 703a, before the operation 703, the transmitting terminal of the VR audio performs smoothing on the received first equipment rotation angle.

The specific smoothing way is similar to that in the operation 702a and will not be repeated here.

At this time, in the operation 703, the transmitting terminal of the VR audio predicts a second equipment rotation angle according to the smoothed first equipment rotation angle and the current network delay information.

When the first equipment rotation angle remains unchanged after the noise is removed, the transmitting terminal can omit the step of predicting the second equipment rotation angle, so that the amount of computation is reduced.

It can be seen from the Embodiment 3 of the disclosure that the smoothing step can be performed by the receiving terminal, or performed by the transmitting terminal, or performed by both the transmitting terminal and the receiving terminal.

Embodiment 4

The Embodiment 4 of the disclosure is another possible implementation of the Embodiment 1 of the disclosure. Based on the Embodiment 2 or Embodiment 3, the operation 704 (the transmitting terminal of the VR audio determines an ambisonics signal rotation angle according to the predicted second equipment rotation angle) may further comprise operations 7041 (not shown) and 7042 (not shown). The steps will be specifically described below.

At operation 7041, the transmitting terminal of the VR audio performs synthesis according to a weight corresponding to the predicted second equipment rotation angle and a weight corresponding to the first equipment rotation angle to obtain the synthesized second equipment rotation angle.

In the Embodiment 4 of the disclosure, the second equipment rotation angle and the first equipment rotation angle each correspond to the respective weight, respectively, and the transmitting terminal of the VR audio can perform synthesis based on the weights to obtain the synthesized second equipment rotation angle.

In addition, a weight corresponding to the first equipment rotation angle $\theta_1$ and a weight corresponding to the second equipment rotation angle $\theta'$ can also be adjusted according to a prediction error rate r, where it is assumed that $w_1$ represents the weight (also called a synthesized weight) corresponding to $\theta'$, $w_2$ represents a weight corresponding to $\theta_1$, $0 \leq w_1 \leq 1$ and $w_2=1-w_1$.

Wherein, the smaller the prediction error rate r is, the larger the synthesized weight $w_1$ is. The synthesis is aimed at reducing the influence from the prediction error caused by a prediction model not conforming to the practical situation. The calculation formula for the prediction error rate $$r = \frac{\text{the number of times of the prediction error higher than } B\% \text{ within } A \text{ s}}{\text{the number of times of prediction within } A \text{ s}}$$

where B is a preset threshold, A denotes the size of a prediction window, and both A and B can be fixed values, or can be determined experientially, or can be adjusted in real time.

In this embodiment of the disclosure, the synthesis formula for the second equipment rotation angle is $\bar{\theta}=w_1\theta'+w_2\theta_1$, where $\bar{\theta}$ is the synthesized second equipment rotation angle.

Wherein, the calculation formula for the synthesized weight is $w_1=i/r$, where i is a constant coefficient. Similar processing is performed on $\varphi$ and $\omega$.

In this embodiment of the disclosure, in the operation 7041, the influence from the prediction error caused by a prediction model not conforming to the practical situation can be reduced.

In the Embodiment 4 of the disclosure, in operation 7041, the first equipment rotation angle can be the first equipment rotation angle that is not smoothed, or the first equipment rotation angle smoothed by the receiving terminal of the VR audio, or the first equipment rotation angle smoothed by the transmitting terminal of the VR audio. This will not be limited in this embodiment of the disclosure.

At operation 7042, the transmitting terminal of the VR audio determines an ambisonics signal rotation angle according to the synthesized second equipment rotation angle.

Embodiment 5

Figure 10:
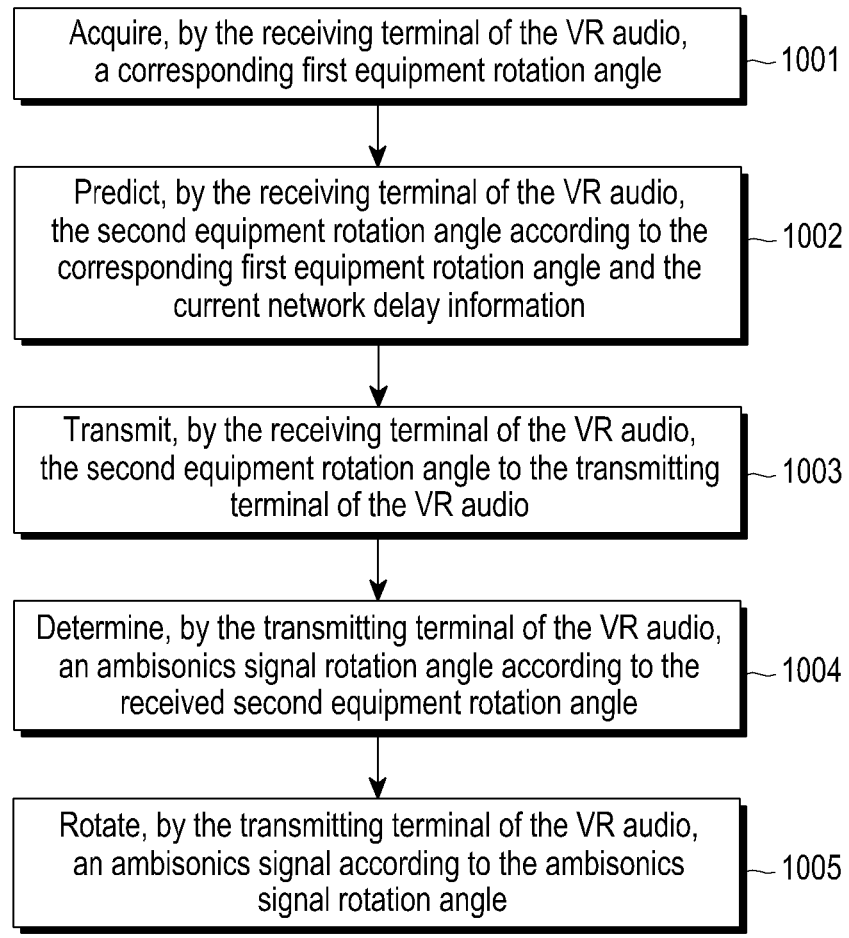
FIG. 10 is a schematic flowchart of yet another method for processing a VR audio according to an embodiment of the disclosure.

FIG. 10 is a schematic flowchart of yet another method for processing a VR audio according to an embodiment of the disclosure.

The Embodiment 5 of the disclosure is another possible implementation of the Embodiment 1 of the disclosure. Based on the Embodiment 1 of the disclosure, the receiving terminal of the VR audio can predict a second equipment rotation angle according to the first equipment rotation angle and then transmit the second equipment rotation angle to the transmitting terminal of the VR audio. As shown in FIG. 10, this method comprises the following steps.

At operation 1001, the receiving terminal of the VR audio acquires a corresponding first equipment rotation angle.

At operation 1002, the receiving terminal of the VR audio predicts a second equipment rotation angle according to the corresponding first equipment rotation angle and current network delay information.

Wherein, the specific way of predicting a second equipment rotation angle according to the first equipment rotation angle and the current network delay information by the receiving terminal of the VR audio is consistent with the way of predicting the second equipment rotation angle in the operation 703, and will not be repeated here.

At operation 1003, the receiving terminal of the VR audio transmits the second equipment rotation angle to the transmitting terminal of the VR audio.

At operation 1004, the transmitting terminal of the VR audio determines an ambisonics signal rotation angle according to the received second equipment rotation angle.

For example, if the second equipment rotation angle is rotation angles $\theta$, $\varphi$, $\omega$ of the equipment about the x-axis, y-axis and z-axis, the final ambisonics signal rotation angle can be $-\theta$, $-\varphi$, $-\omega$.

At operation 1005, the transmitting terminal of the VR audio rotates an ambisonics signal according to the ambisonics signal rotation angle.

After the transmitting terminal of the VR audio receives the second equipment rotation angle, and if packet loss occurs, the influence from the packet loss can be reduced by error concealment. The error concealment means that, if the second equipment rotation angle data is not received at the current moment due to the network packet loss or error, the data at the current moment is estimated by using the data received at a historical moment. For example, a value at a previous moment is used as the value at the current moment, or the lost second equipment rotation angle data is predicted by a prediction algorithm. The error concealment step is an optional step, and can reduce the influence from the network packet loss.

In the Embodiment 5 of the disclosure, the transmitting terminal of the VR audio rotates the ambisonics signal according to the determined ambisonics signal rotation angle, so that a very high spatial resolution is still ensured when the gazing plane is not horizontal.

The transmitting of the VR audio extracts an MOA signal from the rotated ambisonics signal, and transmits the MOA signal to the receiving terminal of the VR audio. The receiving terminal of the VR audio renders and plays the received MOA for the user by itself or other connected equipments. Wherein, the order of the MOA signal can be determined by an order determination method in the prior art. For example, the transmitting terminal of the VR audio extracts an MOA signal according to the preset horizontal order and vertical order (for example, horizontal 3-order and vertical 1-order).

Embodiment 6

The Embodiment 6 of the disclosure is another possible implementation of the Embodiment 1 of the disclosure. Based on the Embodiment 5, an operation 1002*a* (not shown) may further be included before the operation 1002, and an operation 1003*a* (not shown) may further be included before the operation 1003. The steps will be specifically described below.

At operation 1002*a*, the receiving terminal of the VR audio performs smoothing on the acquired first equipment rotation angle.

In this embodiment of the disclosure, the way of smoothing the acquired first equipment rotation angle by the receiving terminal of the VR audio is the same as the way of smoothing the first equipment rotation angle in the operation 702*a*, and will not be repeated here.

Since the first equipment rotation angle is smoothed, the influence from the jitter noise can be eliminated, so that the accuracy of the subsequently determined second equipment rotation angle and ambisonics signal rotation angle can be further improved. When the first equipment rotation angle remains unchanged after the noise is removed, the receiving terminal can omit the step of predicting the second equipment rotation angle, so that the amount of computation is reduced.

At operation 1003*a*, the receiving terminal of the VR audio performs synthesis according to a weight corresponding to the predicted second equipment rotation angle and a weight corresponding to the first equipment rotation angle to obtain the synthesized second equipment rotation angle.

In this embodiment of the disclosure, the way of synthesizing the second equipment rotation angle by the receiving terminal of the VR audio is the same as the way of synthesizing the second equipment rotation angle by the transmitting terminal of the VR audio in the operation 7041, and will not be repeated here.

At this time, in the operation 1003, the receiving terminal of the VR audio transmits the synthesized second equipment rotation angle to the transmitting terminal of the VR audio.

In this embodiment of the disclosure, the second equipment rotation angle synthesized by the receiving terminal of the VR audio can reduce the influence from the prediction error caused by a prediction model not conforming to the practical situation.

Embodiment 7

Figure 11:
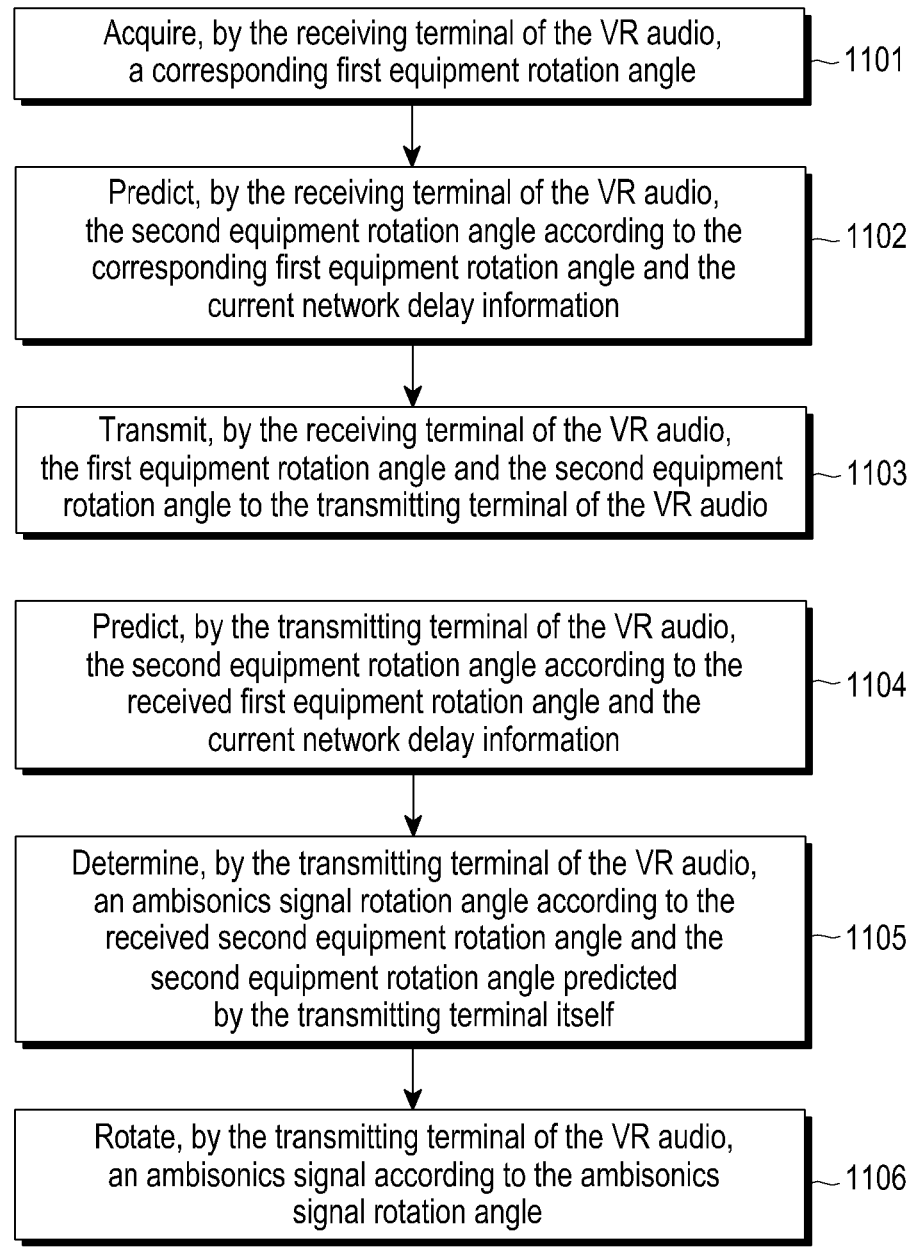
FIG. 11 is a schematic flowchart of still another method for processing a VR audio according to an embodiment of the disclosure.

FIG. 11 is a schematic flowchart of still another method for processing a VR audio according to an embodiment of the disclosure.

The Embodiment 7 of the disclosure is another possible implementation of the Embodiment 1 of the disclosure. Based on the Embodiment 1, as shown in FIG. 11, this method comprises the following steps.

At operation 1101, the receiving terminal of the VR audio acquires a corresponding first equipment rotation angle.

At operation 1102, the receiving terminal of the VR audio predicts a second equipment rotation angle according to the corresponding first equipment rotation angle and current network delay information.

Wherein, the specific way of predicting a second equipment rotation angle according to the first equipment rotation angle and the current network delay information by the receiving terminal of the VR audio is consistent with the way of predicting the second equipment rotation angle by transmitting terminal in the operation 703, and will not be repeated here.

At operation 1103, the receiving terminal of the VR audio transmits the first equipment rotation angle and the second equipment rotation angle to the transmitting terminal of the VR audio.

At operation 1104, the transmitting terminal of the VR audio predicts a second equipment rotation angle according to the received first equipment rotation angle and the current network delay information.

At operation 1105, the transmitting terminal of the VR audio determines an ambisonics signal rotation angle according to the received second equipment rotation angle and the second equipment rotation angle predicted by itself.

At operation 1106, the transmitting terminal of the VR audio rotates an ambisonics signal according to the determined ambisonics signal rotation angle.

After the transmitting terminal of the VR audio receives the first equipment rotation angle and the second equipment rotation angle, and if packet loss occurs, the influence from the packet loss can be reduced by error concealment. The error concealment means that, if the equipment rotation angle data is not received at the current moment due to the network packet loss or error, the data at the current moment is estimated by using the data received at a historical moment. For example, a value at a previous moment is used as the value at the current moment, or the lost equipment rotation angle data is predicted by a prediction algorithm. The error concealment step is an optional step, and can reduce the influence from the network packet loss.

In this embodiment of the disclosure, the transmitting terminal of the VR audio rotates the ambisonics signal according to the determined ambisonics signal rotation angle, so that a very high spatial resolution is still ensured when the gazing plane is not horizontal.

The transmitting terminal of the VR audio extracts an MOA signal from the rotated ambisonics signal, and transmits the MOA signal to the receiving terminal of the VR audio. The receiving terminal of the VR audio renders and plays the received MOA for the user by itself or other connected equipments. Wherein, the order of the MOA signal can be determined by an order determination method in the prior art. For example, the transmitting terminal of the VR audio extracts an MOA signal according to the preset horizontal order and vertical order (for example, horizontal 3-order and vertical 1-order).

In this embodiment of the disclosure, during the execution of the operation 1105, the transmitting terminal of the VR audio determines the ambisonics signal rotation angle according to at least one of the following information:

a transmission situation of the second equipment rotation angle between the transmitting terminal and the receiving terminal;

a transmission situation of the first equipment rotation angle between the transmitting terminal and the receiving terminal;

a network condition between the transmitting terminal and the receiving terminal; and the processing capacity of the transmitting terminal and/or the receiving terminal.

In this embodiment of the disclosure, the network condition between the transmitting terminal of the VR audio and the receiving terminal of the VR audio may be not stable. That is, packet loss may occur when the transmitting terminal of the VR audio and the receiving terminal of the VR audio perform signal transmission.

In this embodiment of the disclosure, the receiving terminal of the VR audio transmits a first equipment rotation angle and a second equipment rotation angle to the transmitting terminal of the VR audio; when the transmitting terminal of the VR audio has successfully received the first equipment rotation angle but failed to receive the second equipment rotation angle predicted by the receiving terminal, the transmitting terminal of the VR audio can determine an ambisonics signal rotation angle according to the second equipment rotation angle predicted by itself; when the transmitting terminal of the VR audio has successfully received the second equipment rotation angle predicted by the receiving terminal but failed to receive the first equipment rotation angle, the transmitting terminal of the VR audio determines an ambisonics signal rotation angle according to the second equipment rotation angle predicted by the receiving terminal; and, when the transmitting terminal of the VR audio has successfully received both the first equipment rotation angle and the second equipment rotation angle predicted by the receiving terminal, the transmitting terminal of the VR audio determines an ambisonics signal rotation angle according to the processing capacity of the transmitting terminal of the VR audio and/or the receiving terminal of the VR audio.

In this embodiment of the disclosure, if the processing capacity of the transmitting terminal of the VR audio is higher than that of the receiving terminal of the VR audio, the transmitting terminal of the VR audio can determine an ambisonics signal rotation angle according to the second equipment rotation angle predicted by itself; or otherwise, the transmitting terminal of the VR audio determines an ambisonics signal rotation angle according to the second equipment rotation angle predicted by the receiving terminal.

As can be seen, in this embodiment of the disclosure, the transmitting terminal and receiving terminal of the VR audio predict a second equipment rotation angle, respectively, and the transmitting terminal of the VR audio determines a final ambisonics signal rotation angle according to preset decision conditions.

Wherein, the preset decision conditions are as follows: if the result of prediction of the receiving terminal of the VR audio fails to be received by the transmitting terminal of the VR audio due to the network packet loss, and the unpredicted rotation angle data (original data) transmitted by the receiving terminal of the VR audio is correctly received by the transmitting terminal of the VR audio, the result of prediction of the transmitting terminal of the VR audio is used; if the unpredicted rotation angle data (original data) transmitted by the receiving terminal of the VR audio fails to be received by the transmitting terminal of the VR audio due to the network packet loss, and the result of prediction of the receiving terminal of the VR audio is correctly received by the transmitting terminal of the VR audio, the result of prediction of the receiving terminal of the VR audio is used; and, if no packet loss occurs in the network and if the algorithm for the transmitting terminal of the VR audio is more complicated and stable, the result of prediction of the transmitting terminal of the VR audio is used.

In this embodiment of the disclosure, an operation 1102a (not shown) can be further included before the operation 1102.

At operation 1102a, the receiving terminal of the VR audio performs smoothing on the acquired first equipment rotation angle.

In this embodiment of the disclosure, the way of smoothing the acquired first equipment rotation angle by the receiving terminal of the VR audio is the same as the way of smoothing the first equipment rotation angle in the operation 702a, and will not be repeated here.

Since the first equipment rotation angle is smoothed, the influence from the jitter noise can be eliminated, so that the accuracy of the subsequently determined second equipment rotation angle and ambisonics signal rotation angle can be further improved. When the first equipment rotation angle remains unchanged after the noise is removed, the receiving terminal can omit the step of predicting the second equipment rotation angle, so that the amount of computation is reduced.

In this embodiment of the disclosure, an operation 1103a (not shown) may further be included before the operation 1103.

At operation 1103a, the receiving terminal of the VR audio performs synthesis according to a weight corresponding to the predicted second equipment rotation angle and a weight corresponding to the first equipment rotation angle to obtain the synthesized second equipment rotation angle.

In this embodiment of the disclosure, the way of synthesizing the second equipment rotation angle by the receiving terminal of the VR audio is the same as the way of synthesizing the second equipment rotation angle by the transmitting terminal of the VR audio in the operation 7041, and will not be repeated here.

At this time, in the operation 1103, the receiving terminal of the VR audio transmits the synthesized second equipment rotation angle and the first equipment rotation angle to the transmitting terminal of the VR audio.

In this embodiment of the disclosure, the second equipment rotation angle synthesized by the receiving terminal of the VR audio can reduce the influence from the prediction error caused by a prediction model not conforming to the practical situation.

In this embodiment of the disclosure, an operation 1105a (not shown) may further be included before the operation 1105.

At operation 1105a, the transmitting terminal of the VR audio performs synthesis according to a weight corresponding to the second equipment rotation angle predicted by itself and a weight corresponding to the received first equipment rotation angle to obtain the synthesized second equipment rotation angle.

In this embodiment of the disclosure, the way of synthesizing the second equipment rotation angle by the transmitting terminal of the VR audio is the same as the way of synthesizing the second equipment rotation angle by the transmitting terminal of the VR audio in the operation 7041, and will not be repeated here.

At this time, in the operation 1105, the transmitting terminal of the VR audio determines an ambisonics signal rotation angle according to the received second equipment rotation angle and the synthesized second equipment rotation angle.

Embodiment 8

Figure 12:
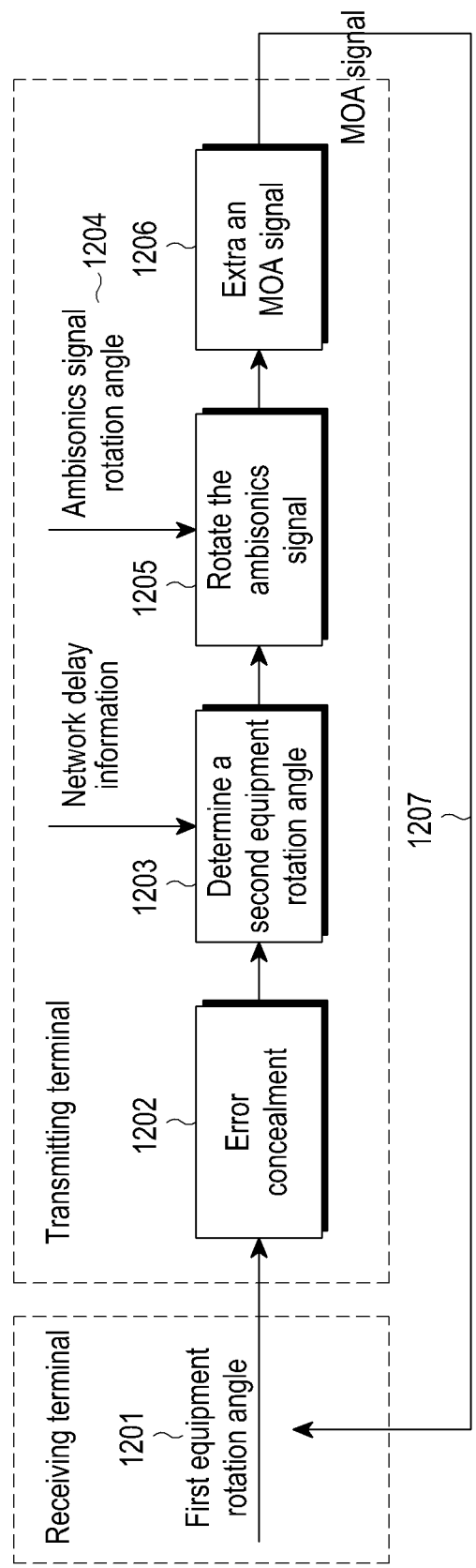
FIG. 12 is a schematic flowchart of further another method for processing a VR audio according to an embodiment of the disclosure.

FIG. 12 is a schematic flowchart of further another method for processing a VR audio according to an embodiment of the disclosure.

This embodiment of the disclosure is a preferred embodiment of the disclosure, as shown in FIG. 12, wherein:

At operation 1201, a receiving terminal of a VR audio acquires a first equipment rotation angle and then transmits the first equipment rotation angle to a transmitting terminal of the VR audio.

At operation 1202, the transmitting terminal of the VR audio performs error concealment.

At operation 1203, the transmitting terminal of the VR audio determines a second equipment rotation angle according to the first equipment rotation angle and current network delay information.

At operation 1204, the transmitting terminal of the VR audio determines an ambisonics signal rotation angle according to the second equipment rotation angle.

At operation 1205, the transmitting terminal of the VR audio rotates an ambisonics signal according to the ambisonics signal rotation angle.

At operation 1206, the transmitting terminal of the VR audio extracts an MOA signal from the rotated ambisonics signal.

At operation 1207, the transmitting terminal of the VR audio transmits the extracted MOA signal to the receiving terminal of the VR audio.

Figure 13:
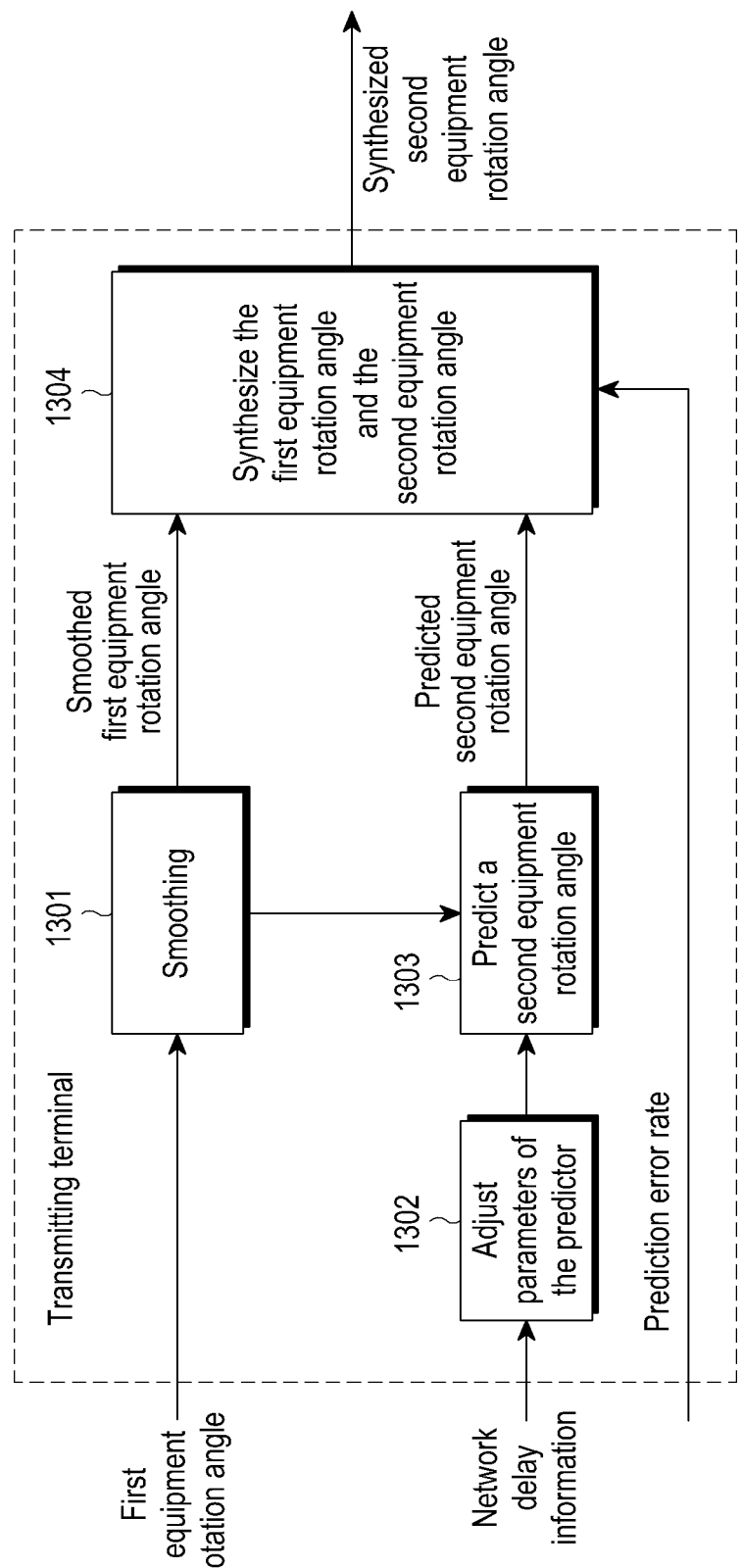
FIG. 13 is a schematic flowchart of determining a second equipment rotation angle according to an embodiment of the disclosure.

FIG. 13 is a schematic flowchart of determining a second equipment rotation angle according to an embodiment of the disclosure.

Wherein, as shown in FIG. 13, the specific process of the operation 1203 comprises the following steps.

At operation 1301, the transmitting terminal of the VR audio performs smoothing on the first equipment rotation angle to obtain the smoothed first equipment rotation angle.

At operation 1302, the transmitting terminal of the VR audio adjusts parameters of a predictor according to the network delay information.

At operation 1303, the transmitting terminal of the VR audio predicts a second equipment rotation angle according to the smoothed first equipment rotation angle and by using the predictor with the adjusted parameters.

At operation 1304, the transmitting terminal of the VR audio synthesizes the smoothed first equipment rotation angle and the predicted second equipment rotation angle according to a prediction error rate, to obtain the synthesized second equipment rotation angle.

Figure 14:
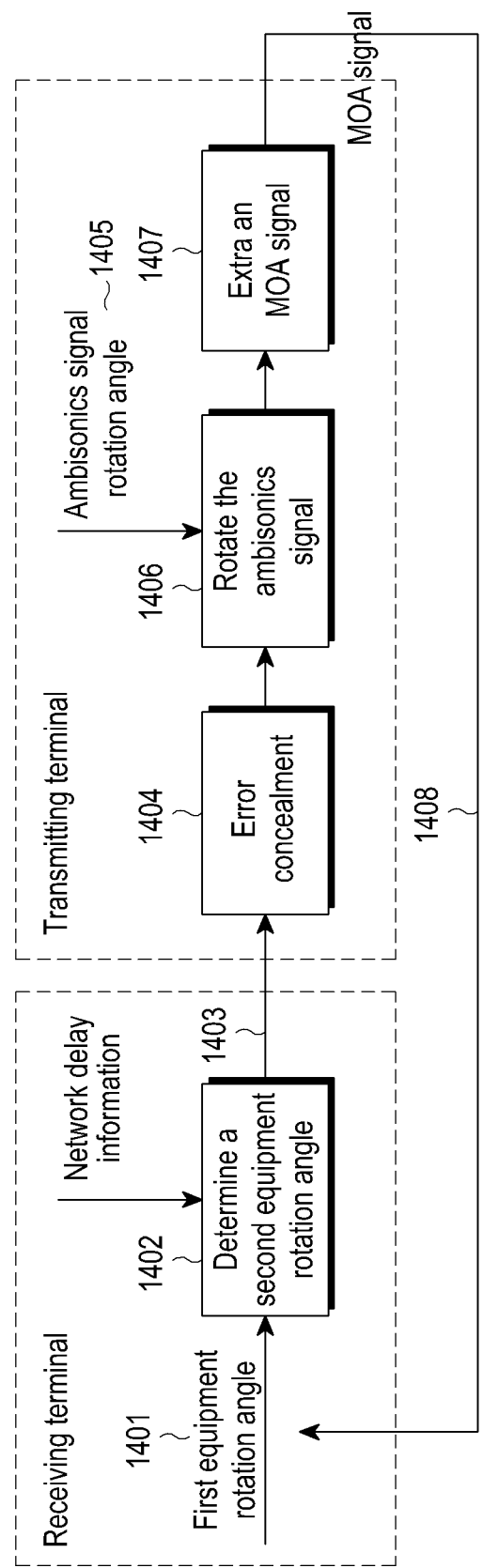
FIG. 14 is a schematic flowchart of a preferred method for processing a VR audio according to an embodiment of the disclosure.

FIG. 14 is a schematic flowchart of a preferred method for processing a VR audio according to an embodiment of the disclosure.

Another preferred embodiment of disclosure is provided, as shown in FIG. 14, wherein:

At operation 1401, the receiving terminal of the VR audio acquires a corresponding first equipment rotation angle.

At operation 1402, the receiving terminal of the VR audio determines a second equipment rotation angle according to the first equipment rotation angle and current network delay information.

At operation 1403, the receiving terminal of the VR audio transmits the determined second equipment rotation angle to the transmitting terminal of the VR audio.

At operation 1404, the transmitting terminal of the VR audio performs error concealment.

At operation 1405, the transmitting terminal of the VR audio determines an ambisonics signal rotation angle according to the second equipment rotation angle.

At operation 1406, the transmitting terminal of the VR audio rotates an ambisonics signal according to the ambisonics signal rotation angle.

At operation 1407, the transmitting terminal of the VR audio extracts an MOA signal from the rotated ambisonics signal.

At operation 1408, the transmitting terminal of the VR audio transmits the extracted MOA signal to the receiving terminal of the VR audio.

Figure 15:
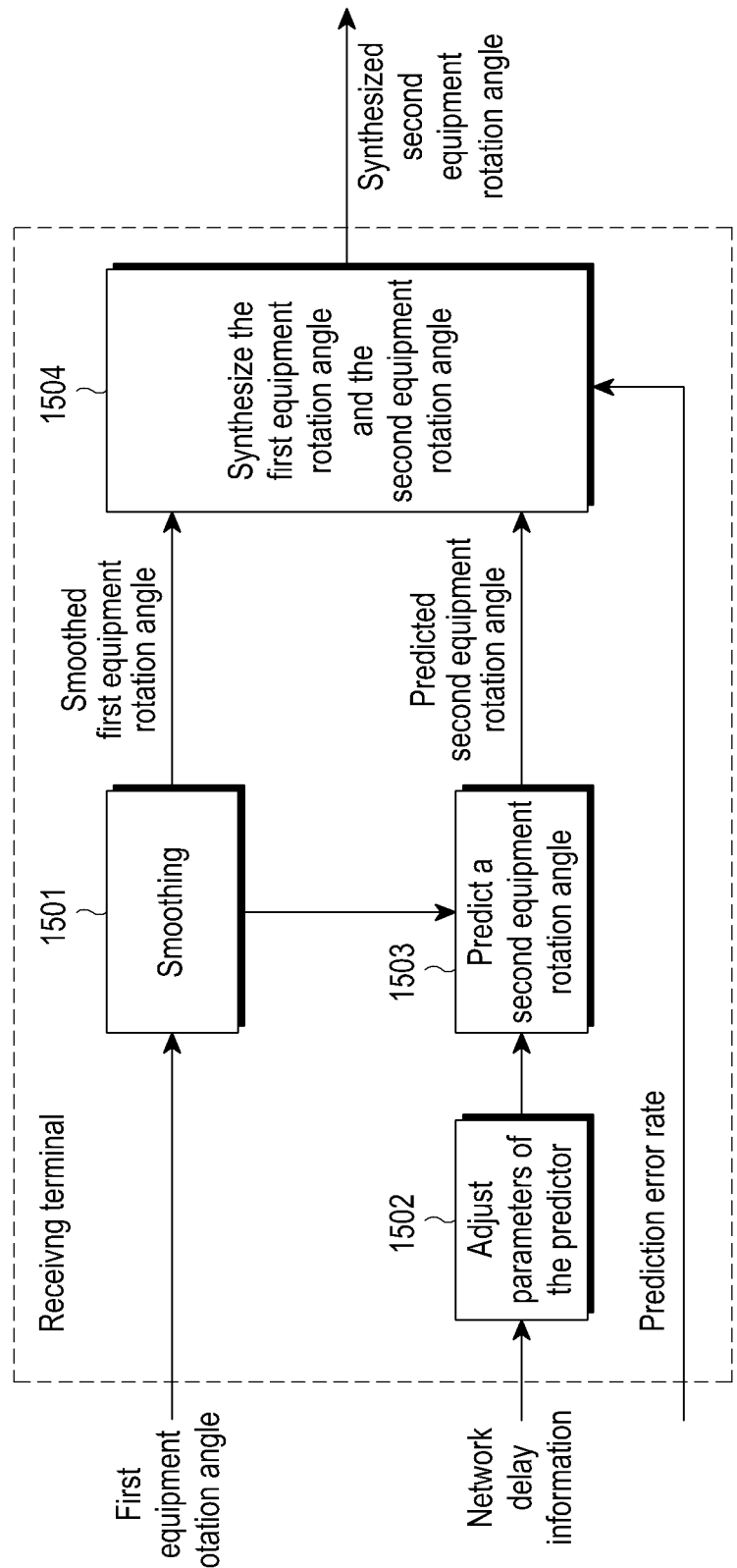
FIG. 15 is another schematic flowchart of determining the second equipment rotation angle according to an embodiment of the disclosure.

FIG. 15 is another schematic flowchart of determining the second equipment rotation angle according to an embodiment of the disclosure.

Wherein, as shown in FIG. 15, the specific process of the operation 1402 comprises the following steps.

At operation 1501, the receiving terminal of the VR audio performs smoothing on the first equipment rotation angle to obtain the smoothed first equipment rotation angle.

At operation 1502, the receiving terminal of the VR audio adjusts parameters of a predictor according to the network delay information.

At operation 1503, the receiving terminal of the VR audio predicts a second equipment rotation angle according to the smoothed first equipment rotation angle and by using the predictor with the adjusted parameters.

At operation 1504, the receiving terminal of the VR audio synthesizes the smoothed first equipment rotation angle and the predicted second equipment rotation angle according to a prediction error rate, to obtain the synthesized second equipment rotation angle.

Embodiment 9

Figure 16:
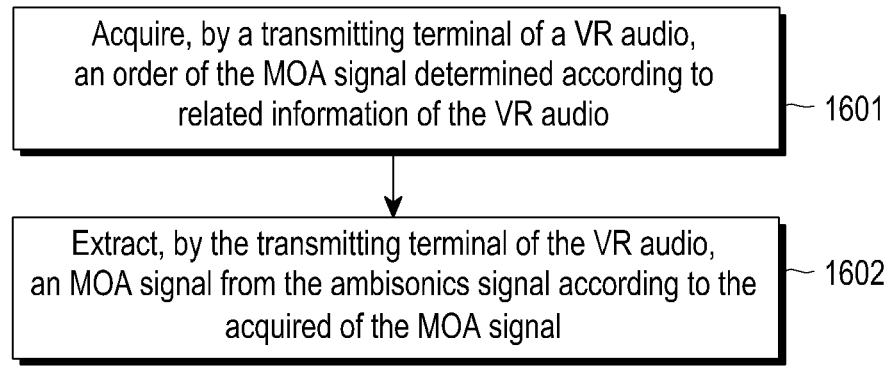
FIG. 16 is a schematic flowchart of yet another method for processing a VR audio according to an embodiment of the disclosure.

FIG. 16 is a schematic flowchart of yet another method for processing a VR audio according to an embodiment of the disclosure.

Another possible implementation of the various embodiments of the disclosure comprises the following steps, as shown in FIG. 16.

At operation 1601, a transmitting terminal of a VR audio acquires an order of an MOA signal determined according to related information of the VR audio.

Wherein, the related information of the VR audio comprises at least one of the following: content-related information of the VR audio, playback-related information of the VR audio, and transmission-related information of the VR audio.

Wherein, the content-related information of the VR audio comprises at least one of: content correlation information of the VR audio, sound source direction information of VR audio contents and VR content type information; the playback-related information of the VR audio comprises playback environment noise information, and information about the number of virtual loudspeakers of the receiving terminal of the VR audio; and the transmission-related information of the VR audio comprises at least one of transmission network bandwidth information and transmission network delay information.

At operation 1602, the transmitting terminal of the VR audio extracts an MOA signal from an ambisonics signal according to the acquired order of the MOA signal.

In the Embodiment 9 of the disclosure, the ambisonics signal can be a rotated or non-rotated ambisonics signal, and the transmitting terminal of the VR audio can extract an MOA signal from the non-rotated ambisonics signal directly according to the order of the MOA signal upon acquiring the order of the MOA signal.

In this embodiment of the disclosure, the Embodiment 9 can be performed not based on any one of the Embodiments 1 to 8. In other words, the Embodiment 9 can be performed separately. This will not be limited here.

Although the bandwidth occupancy in the existing MOA technology is somewhat reduced in comparison with the ambisonics technology, in practical applications, the bandwidth of the MOA technology is still too high and the spatial resolution still needs to be improved.

The Embodiment 9 of the disclosure provides a method for processing a VR audio. Compared with the prior art, in this embodiment of the disclosure, the receiving terminal of the VR audio acquires an order of an MOA signal determined according to related information of the VR audio and then extracts an MOA signal according to the order of the MOA signal, so that the accuracy of the spatial resolution can be improved and/or the bandwidth occupancy can be reduced.

Embodiment 10

As another possible implementation of the various embodiments of the disclosure, based on the Embodiment 9, the operation 1602 of acquiring, by the transmitting terminal of the VR audio, an order of an MOA signal determined according to related information of the VR audio may comprise operations 16021 to 16022 (not shown).

At operation 16021, the transmitting terminal of the VR audio acquires related information of the VR audio.

Operations 16021a to 16021b (not shown) may further be included before the operation 16022.

At operation 16021a, the receiving terminal of the VR audio acquires related information of the VR audio.

The related information in the operation 16021a comprises at least one of the following: content-related information of the VR audio, playback-related information of the VR audio, and transmission-related information of the VR audio.

At operation 1602b, the receiving terminal of the VR audio transmits the acquired related information of the VR audio to the transmitting terminal of the VR audio.

At operation 16022, the transmitting terminal of the VR audio determines an order of an MOA signal according to the acquired related information.

Wherein, the operation 16022 comprises at least one of operations 16022b1, 16022b2 and 16022b3, wherein:

At operation 16022b1, the transmitting terminal of the VR audio determines a total order of the MOA signal according to at least one of the VR content type information, the transmission network bandwidth information, the transmission network delay information, the playback environment noise information and the information about the number of virtual loudspeakers of the receiving terminal.

The transmitting terminal of the VR audio can determine, according to the determined total order of the MOA signal, a corresponding order of the current MOA signal in a first direction and/or a corresponding order of the current MOA signal in a second direction, and then extract the MOA signal according to the order in the first direction and/or the order in the second direction.

Wherein, the transmitting terminal of the VR audio can determine, according to a preset principle for allocating the order in the first direction and the order in the second direction, the order in the first direction and the order in the second direction. In addition, the transmitting terminal of the VR audio can also adopt a way of determining a corresponding order of the current MOA signal in a first direction and/or a corresponding order of the current MOA signal in a second direction as described in the following embodiments, and this way will not be repeated here.

Wherein, the first direction can be but not limited to the horizontal/vertical direction, and the second direction can be but not limited to the vertical/horizontal direction.

In this embodiment of the disclosure, the transmitting terminal of the VR audio can receive current playback environment noise information transmitted by the receiving terminal of the VR audio, and then determine the total order of the MOA signal according to the current playback environment noise information. In this embodiment of the disclosure, the playback environment noise information can be acquired by the receiving terminal of the VR audio. For example, the environment noise information can be acquired by a microphone on a mobile phone or on an earphone.

In this embodiment of the disclosure, the receiving terminal of the VR audio samples the current playback environment noise, determines a sampled signal corresponding to each sampling point, and determines the energy of the current playback environment noise according to the sampled signal corresponding to each sampling point; and, the transmitting terminal of the VR audio determines the total order of the MOA signal according to the energy of the current playback environment noise. In this embodiment of the disclosure, the receiving terminal of the VR audio can determine the energy of the current playback environment noise according to the formula:

$$E = \sum_{n=0}^{N-1} s^2(n)$$

where N denotes the number of sampling points required for calculating the energy and s(n) denotes the noise signal.

In this embodiment of the disclosure, if the receiving terminal of the VR audio transmits the energy of the playback environment noise to the transmitting terminal of the VR audio, the transmitting terminal of the VR audio decides the total order of the MOA signal according to the energy of the playback environment noise. Since the user is difficult to clearly distinguish the position of a sound source in a case in which the playback environment noise is higher than the threshold C, the total order of the MOA signal can be reduced in the case of high environment noise, so that the bandwidth occupancy is reduced.

In this embodiment of the disclosure, the transmitting terminal of the VR audio receives information about the number of virtual loudspeakers transmitted by the receiving terminal of the VR audio, and determines the total order of the MOA signal according to the information about the number of virtual loudspeakers. If there are few virtual loudspeakers in the receiving terminal of the VR audio, the total order of the MOA signal can be properly reduced, so that the bandwidth occupancy is reduced.

In this embodiment of the disclosure, the receiving terminal of the VR audio can adjust the number of virtual loudspeakers in the receiving terminal according to at least one of the current gazing direction of the user, the current battery level of the receiving terminal of the VR audio and the computation capability of the receiving terminal of the VR audio.

Figure 17:
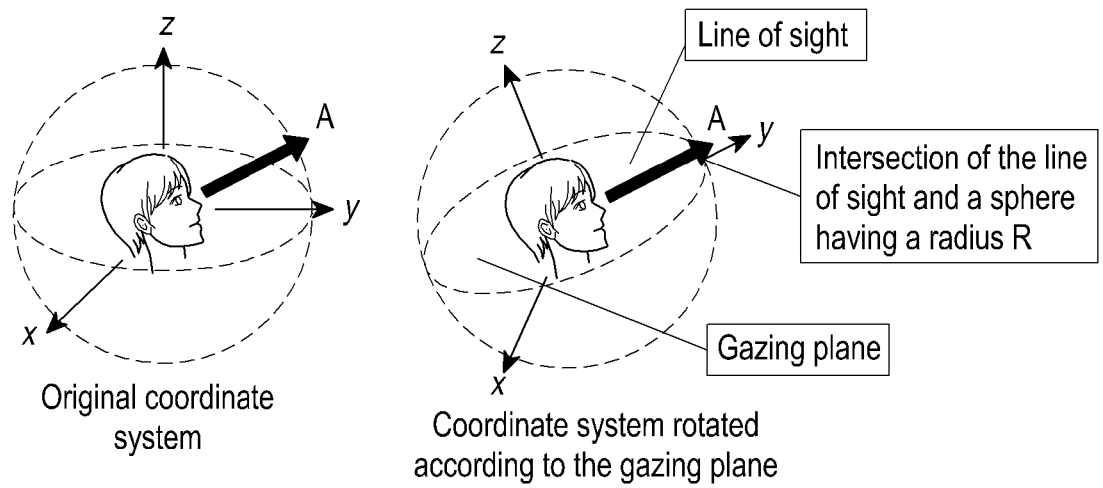
FIG. 17 is a schematic diagram after rotating according to the gazing plane of the user according to an embodiment of the disclosure.

FIG. 17 is a schematic diagram after rotating according to the gazing plane of the user according to an embodiment of the disclosure.

In this embodiment of the disclosure, FIG. 17 shows the meaning of an intersection of the user's line of sight and a sphere having a radius R. Wherein, the original coordinate system is rotated along the x-axis and y-axis, respectively, the plane determined by the rotated x-axis and y-axis is a plane where the gazing plane of the user is located, and the point A in FIG. 17 denotes the interaction of the line of sight and the sphere having a radius R. If it is assumed that the coordinates of the point A in the original coordinate system are [x̃, ỹ, z̃], after the coordinate axes are rotated, the coordinates of the point A in the new coordinate system are as follows:

$$[\hat{x}, \hat{y}, \hat{z}] = [\tilde{x}, \tilde{y}, \tilde{z}] \begin{bmatrix} 1 & 0 & 0 \\ 0 & \cos\theta & -\sin\theta \\ 0 & \sin\theta & \cos\theta \end{bmatrix} \begin{bmatrix} \cos\varphi & 0 & -\sin\varphi \\ 0 & 1 & 0 \\ \sin\varphi & 0 & \cos\varphi \end{bmatrix}$$

where θ is a counterclockwise rotation angle of the gazing plane about the x-axis, φ is counterclockwise rotation angle of the gazing plane about the y-axis, and ẑ calculated according to the formula should be 0.

Figure 18:
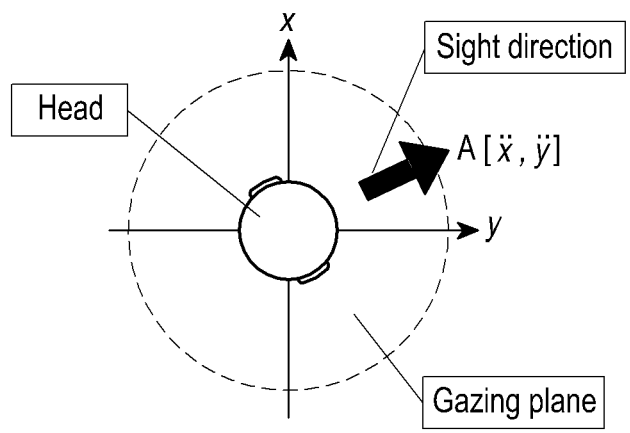
FIG. 18 is a schematic diagram of the current gazing direction of the user according to an embodiment of the disclosure.

FIG. 18 is a schematic diagram of the current gazing direction of the user according to an embodiment of the disclosure.

In this embodiment of the disclosure, the receiving terminal collects current rotation angle information θ, φ, ω of the gazing plane of the user by a sensor, and then calculates [ẍ, ÿ] according to the information. Wherein, the receiving terminal can determine the sight direction of the current gazing plane of the user shown in FIG. 18 according to the coordinates [ẍ, ÿ], i.e., the current gazing direction of the user.

In this embodiment of the disclosure, according to the fact that the human ears are more sensitive to the sound in the front than the sound on the right and left and the sound in the rear, and more sensitive to the sound in the horizontal direction than the sound in the vertical direction, the receiving terminal of the VR audio can reduce the number of virtual loudspeakers in at least one of the left and right directions, the rear direction and the vertical direction, wherein the formula for two-ear rendering is as follows:

$$L = \sum_{l=1}^{L} h_l * s_l$$

where $h_l$ denotes a head related transfer function (HRTF) corresponding to the $l^{th}$ virtual loudspeaker, * denotes the convolution, and $s_l$ denotes the signal from the $i^{th}$ virtual loudspeaker.

Figure 19:
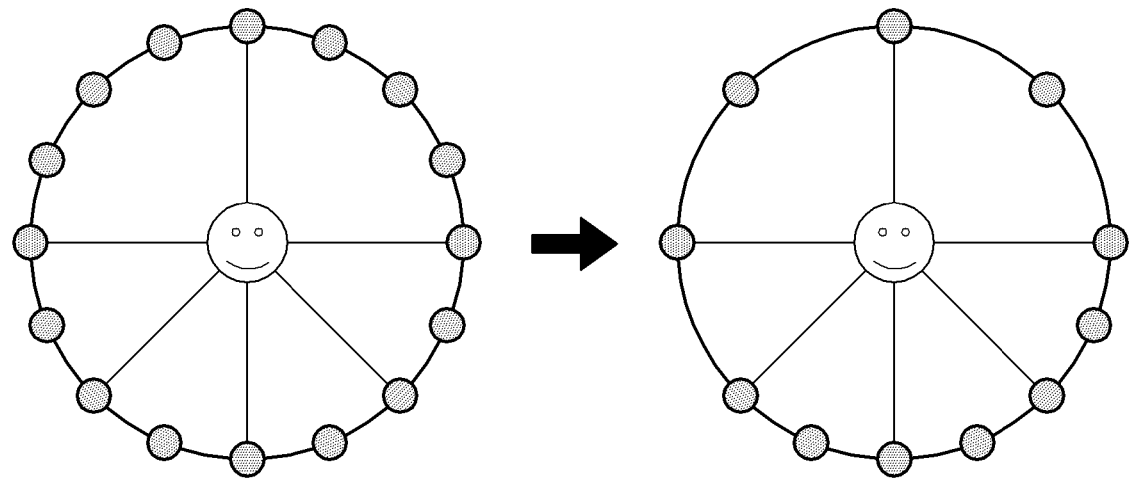
FIG. 19 is a schematic diagram of the number of virtual loudspeakers in the horizontal direction according to an embodiment of the disclosure.

FIG. 19 is a schematic diagram of the number of virtual loudspeakers in the horizontal direction according to an embodiment of the disclosure.

Wherein, it can be seen from the formula that the amount of computation is less if there are fewer virtual loudspeakers. FIG. 19 shows a schematic diagram of the number of virtual loudspeakers in the horizontal direction.

In this embodiment of the disclosure, the receiving terminal of the VR audio acquires the current battery level and/or the computation capability of the receiving terminal equipment of the VR audio, and further adjusts the number of virtual loudspeakers according to the current battery level and/or the computation capability. In this embodiment of the disclosure, if the batter level of the equipment is insufficient, it is required to further reduce the number of virtual loudspeakers, according to the fact that the human ears are more sensitive to the sound in the front than the sound on the left and right and the sound in the rear. In this embodiment of the disclosure, if the number of virtual loudspeakers exceeds the computation capability of the receiving terminal equipment of the VR audio, it is required to further reduce the number of virtual loudspeakers.

In this embodiment of the disclosure, the MOA technology has a high rendering power consumption in the client. This is because the amount of computation for two-ear rendering is directly proportional to the number of virtual loudspeakers and many virtual loudspeakers are generally required during rendering. The receiving terminal of the VR audio can reduce the number of virtual loudspeakers in the above way, so that the power consumption of the receiving terminal of the VR audio is decreased.

In this embodiment of the disclosure, the receiving terminal of the VR audio transmits the adjusted number of virtual loudspeakers to the transmitting terminal of the VR audio, so that the transmitting terminal of the VR audio determines the total order of the MOA signal according to the information about the number of virtual loudspeakers.

In this embodiment of the disclosure, the transmitting terminal of the VR audio determines the total order of the MOA signal according to at least one of the VR content type information, the transmission network bandwidth information, the transmission network delay information, the playback environment noise information and the information about the number of virtual loudspeakers in the receiving terminal, and according to a weight corresponding to the each kind of information.

In this embodiment of the disclosure, the weight corresponding to the each kind of information can be predetermined according to experience, or can be adjusted. For example, for a VR content type having higher requirements on fluency, for example, sports competition program content, the weight of the network bandwidth may be larger. When the network bandwidth is insufficient, the total order can be decreased to ensure the timeliness of content transmission. However, for music program content, the weight of the network bandwidth may be lower, and an order as high as possible can be used to ensure the audio quality.

For the same VR audio content, if it is assumed that the total order of the MOA signal is determined by using only the following conditions i, ii and iv, according to the experience or the settings of a content provider, the weight of the condition i can be $U_i=5$, the weight of the condition ii can be $U_{ii}=3$, and the weight of the condition iv can be $U_{iv}=1$.

If the content is music content, it is assumed that the total order is $P_i=10$ according to the decision of the condition i. If, in this case, the available network bandwidth is low, the total order is $P_{ii}=3$ according to the decision of the condition ii. If, in this case, there is low noise, the total order is $P_{iv}=9$ according to the decision of the condition iv. Thus, the total order P is $$P = \frac{P_i U_i + P_{ii} U_{ii} + P_{iv} U_{iv}}{U_i + U_{ii} + U_{iv}} = \frac{10 \times 5 + 3 \times 3 + 9 \times 1}{5 + 3 + 1} = \frac{68}{9},$$

and P is rounded to obtain P=8.

If this content is not music content and the result of decision of the conditions ii and iv is the same as the above result, the total order P is $$P = \frac{P_{ii} U_{ii} + P_{iv} U_{iv}}{U_{ii} + U_{iv}} = \frac{3 \times 3 + 9 \times 1}{3 + 1} = \frac{18}{4},$$

and P is rounded to obtain P=5.

In this embodiment of the disclosure, the decision includes two parts: total order decision and decision of an order in a first direction and/or decision of an order in a second direction, which correspond to different input conditions. Wherein:

The input conditions corresponding to the total order decision are as follows:

i. whether the content is audio content of a set type, where the set type can be music or more; the transmitting terminal of the VR audio decides whether it is a music signal according to a content label, and the total order is increased as high as possible to improve the spatial resolution if the content is music content;

ii. transmission network bandwidth: if the network bandwidth becomes narrower, the total order is decreased; or otherwise, the total order is increased;

iii. transmission network delay: if the network delay is very large, the total order can be increased;

in this embodiment of the disclosure, since the direction prediction error will become larger when the network delay is very large, the order can be increased to compensate for the influence from the prediction error; and iv. playback environment noise: when the playback environment noise is higher (or higher than a preset threshold), the total order can be decreased.

At operation 16022*b*2, the transmitting terminal of the VR audio determines, according to at least one of the content correlation information of the VR audio and the sound source direction information of VR audio contents, an order of the MOA signal in a first direction and/or a second direction.

In this embodiment, the transmitting terminal of the VR audio determines correlation information of the ambisonics signal in a first direction and/or correlation information of the ambisonics signal in a second direction, respectively; and then determines, according to the correlation information of the ambisonics signal in the first direction and/or the correlation information of the ambisonics signal in the second direction, an order of the MOA signal in the first direction and/or the second direction.

In this embodiment of the disclosure, before the operation 1602202, a final ambisonics signal rotation direction can be first determined in accordance with the steps in the Embodiments 1 to 8, the current ambisonics signal is then rotated according to the rotation direction, and correlation information of the rotated ambisonics signal in the first direction and/or correlation information of the rotated ambisonics signal in the second direction is determined, respectively.

Figure 20:
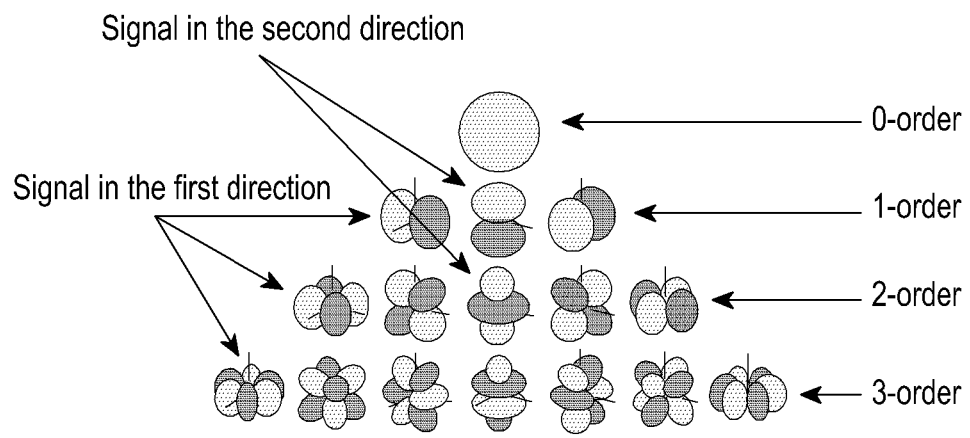
FIG. 20 is a schematic diagram of first direction signals and second direction signals of 3-order ambisonics according to an embodiment of the disclosure.

FIG. 20 is a schematic diagram of first direction signals and second direction signals of 3-order ambisonics according to an embodiment of the disclosure.

For example, by taking a 3-order ambisonics signal as example, FIG. 20 shows a first signal and a second signal used for determining the correlation information in this embodiment of the disclosure.

In this embodiment of the disclosure, the application scenario of is a case in which a sound source in the first direction and a sound source in the second direction are very weak in directivity, for example, the background music of a TV program.

Wherein, the way of determining the correlation information of the ambisonics signal in the first direction and/or the correlation information of the ambisonics signal in the second direction will be described below.

In this embodiment of the disclosure, the transmitting terminal of the VR audio determines, according to a sound channel in the first direction, correlation information of the ambisonics information in the first direction.

Specifically, the correlation information of the ambisonics information in the first direction and/or the correlation information of the ambisonics information in the second direction may be obtained in the following formula A correlation coefficient of X and Y sound channels is as follows:

$$\rho_{XY} = \frac{Cov(X, Y)}{\sqrt{D(X)} \sqrt{D(Y)}}$$

where Cov(X,Y) denotes a covariance, and $\sqrt{D(\cdot)}$ denotes a deviation. The correlation coefficients of the sound channel in the first direction and/or the sound channel in the second direction can be calculated by pairs. If all correlation coefficients are close to 1, it is indicated that the correlation is high; or otherwise, it is indicated that the correlation is low.

In this embodiment of the disclosure, if the correlation of the ambisonics signal in the first direction is higher than the correlation of the ambisonics signal in the second direction, the transmitting terminal of the VR audio adjusts the corresponding order of the MOA signal in the first direction to be higher than the corresponding order of the MOA signal in the second direction; and, if the correlation of the ambisonics signal in the first direction is lower than the correlation of the ambisonics signal in the second direction, the transmitting terminal of the VR audio adjusts the corresponding order of the MOA signal in the first direction to be lower than the corresponding order of the MOA signal in the second direction.

In this embodiment of the disclosure, if the correlation in the first direction is high, it is indicated that the signal in the first direction has a low directivity, and a lower order can be allocated in this case; and, if the correlation in the second direction is high, it is indicated that the signal in the second direction has a low directivity, and a lower order can be allocated in this case.

In this embodiment of the disclosure, for a direction with a high correlation, a lower order is allocated; while for a direction with a low correlation, a higher order is allocated. In this way, the bandwidth reduction is realized and the spatial resolution is improved. Specifically, the bandwidth occupancy can be reduced while keeping the spatial resolution unchanged; or, the spatial resolution can be improved while keeping the bandwidth unchanged; or, the spatial resolution can be improved while reducing the bandwidth.

For example, 5-order MOA signals are allocated for the horizontal direction and 3-order MOA signals are allocated for the vertical direction (there are total 20 signals). When the horizontal direction has a low correlation and the vertical direction has a high correlation (it is enough to express the vertical direction by 1-order), 6-order signals can be allocated for the horizontal direction and 1-order signals can be allocated for the vertical direction (there are total 14 signals), so that the spatial resolution can be improved (the resolution in the horizontal direction is improved and the resolution in the vertical direction remains unchanged, and the overall spatial resolution is improved) while reducing the bandwidth occupancy. When the horizontal direction has a high correlation, 4-order signals can be allocated (it is enough to express the horizontal direction by 4-order), and 3-order signals are allocated for the vertical direction (there are total 18 signals), so that the bandwidth occupancy can be reduced while keeping the spatial resolution unchanged.

In this embodiment, the transmitting terminal of the VR audio determines sound source energy of the ambisonics signal in a first direction and/or sound source energy of the ambisonics signal in a second direction, respectively; and then determines, according to the sound source energy of the ambisonics signal in the first direction and/or the sound source energy of the ambisonics signal in the second direction, an order of the MOA signal in the first direction and/or the second direction.

In this embodiment of the disclosure, the transmitting terminal of the VR audio acquires a multiple of sound signals in the first direction, and then determines, according to the multiple sound signals in the first direction and the corresponding order of the MOA signal in the first direction at the current moment, sound source energy of the current MOA signal in the first direction; and/or, the transmitting terminal of the VR audio acquires a multiple of sound signals in the second direction, and then determines, according to the multiple of sound signals in the second direction and the corresponding order of the MOA signal in the second direction at the current moment, sound source energy of the current ambisonics signal in the second direction.

Specifically, if it is assumed that the original ambisonics signal is in K-order, the transmitting terminal of the VR audio determines sound source energy in the first direction (e.g., the horizontal direction) according to the formula $$E_H = \frac{\sum_{k=1}^{K} \sum_{n=0}^{N-1} (H_k'^2(n) + H_k^2(n))}{2K},$$

where $H_k'$ and $H_k$ are sound signals in the first direction (e.g., the horizontal direction).

Figure 21:
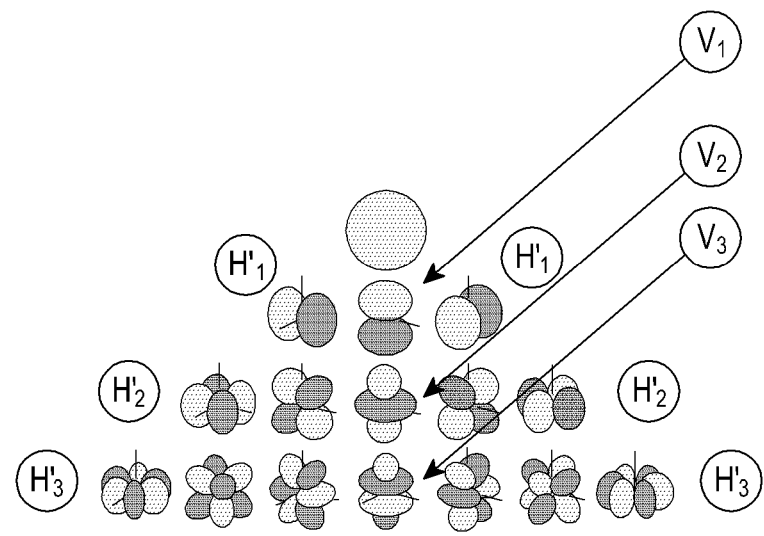
FIG. 21 is a schematic diagram of the first direction signals and the second direction signals according to an embodiment of the disclosure.

FIG. 21 is a schematic diagram of the first direction signals and the second direction signals according to an embodiment of the disclosure.

Referring to FIG. 21, if the original ambisonics signal is in 3-order, the transmitting terminal of the VR audio determines sound source energy in the horizontal direction according to the formula $$E_H = \frac{\sum_{k=1}^{3} \sum_{n=0}^{N-1} (H_k'^2(n) + H_k^2(n))}{6}.$$

In this embodiment of the disclosure, if it is assumed that the original ambisonics signal is in K-order, the transmitting terminal of the VR audio determines sound source energy in the second direction (e.g., the vertical direction) according to the formula $$E_V = \frac{\sum_{k=1}^{K} \sum_{n=0}^{N-1} V_k^2(n)}{K},$$

where $V_k$ is a sound signal in the second direction (e.g., the vertical direction).

For example, as shown in FIG. 21, if the original ambisonics signal is in 3-order, the transmitting terminal of the VR audio determines sound source energy in the vertical direction according to the formula $$E_V = \frac{\sum_{k=1}^{K} \sum_{n=0}^{N-1} V_k^2(n)}{K}.$$

In this embodiment of the disclosure, when the sound source energy of the ambisonics signal in the first direction is less than the sound source energy of the ambisonics signal in the second direction, the corresponding order of the MOA signal in the second direction is increased, and the corresponding order of the MOA signal in the first direction is decreased, so that the spatial resolution can be improved without increasing the bandwidth. In this case, the corresponding order in the first direction can also be further decreased, so that the spatial resolution is improved under the condition of reducing the bandwidth. Or, the order in the second direction remains unchanged while the order in the first direction is decreased, so that the bandwidth occupancy is reduced under the condition of keeping the spatial resolution unchanged. When the energy of the ambisonics signal in the first direction is greater than the energy of the ambisonics signal in the second direction, the corresponding order of the MOA signal in the second direction is decreased, and the corresponding order of the MOA signal in the first direction is increased, so that the spatial resolution can be improved without increasing the bandwidth.

At operation 16022b3, the transmitting terminal of the VR audio determines, according to at least one of the VR content type information, the transmission network bandwidth information, the transmission network delay information, the playback environment noise information and the information about the number of virtual loudspeakers in the receiving terminal, a total order of the MOA signal, and determines, according to at least one of the content correlation information of the VR audio and the sound source direction information of VR audio contents, an order of the MOA signal in the first direction and/or the second direction.

The input conditions corresponding to the decision of the order in the first direction and/or the second direction are as follows:

v. correlation information of the ambisonics signal in the first direction and/or correlation of the ambisonics signal in the second direction; and vi. sound source energy of the ambisonics signal in the first direction and/or sound source energy of the ambisonics signal in the second direction.

In this embodiment of the disclosure, in practical applications, the decision conditions can be freely combined according to actual conditions. For example, when adjusting the total order, the order in the first direction and the order in the second direction according to the above conditions, the total order can be adjusted first, and the order in the first direction and the order in the second direction are then adjusted. The specific steps are as follows:

a) the total order is decided according to the parameters i, ii, iii and iv, and the result of decision (the total order of the MOA signal) is assumed as z'-order;

b) a ratio of the order in the first direction to the order in the second direction is decided according to the parameters v and vi, and the ratio is assumed as f/g; and c) the order in the first direction and the order in the second direction are calculated according to the formulae $$x' = \frac{x'f}{f+g} \text{ and } y' = \frac{x'g}{f+g};$$

where both x' and y' are rounded, to ensure a sum of x' and y' to be z'.

Wherein, the ratio of the order in the first direction to the order in the second direction can also be calculated first, and the total order is then decided; and then, the order in the first direction and the order in the second direction are calculated. The specific steps are as follows:

a) the ratio of the order in the first direction to the order in the second direction is decided according to the parameters v and vi, and the ratio is assumed as f/g;

b) the total order is decided according to parameters i, ii, iii and iv, and the result of decision is assumed as z'-order;

c) the order x' in the horizontal direction and the order y' in the vertical direction are calculated according to the following formulas:

$$x' = \frac{x'f}{f+g}$$

$$y' = \frac{x'g}{f+g}$$

d) both x' and y' are rounded, to ensure a sum of x' and y' to be z'.

In this embodiment of the disclosure, the order is decided comprehensively according the above conditions, so that the effect of reducing the bandwidth occupancy while keeping the spatial resolution unchanged, or improving the spatial resolution while keeping the bandwidth unchanged, or improving the spatial resolution while reducing the bandwidth can be realized.

Embodiment 11

As another possible implementation of the various embodiments of the disclosure, based on the Embodiment 9, the operation 1602 of acquiring, by the transmitting terminal of the VR audio, an order of an MOA signal determined according to related information of the VR audio comprises operations 16023 to 16024 shown in the Embodiment 10.

At operation 16023, the transmitting terminal of the VR audio receives an order of the MOA signal determined according to the related information of the VR audio by the receiving terminal of the VR audio.

In this embodiment of the disclosure, the receiving terminal of the VR audio can determine a total order of the MOA signal according to the playback environment noise and/or the information about the number of virtual loudspeakers in the receiving terminal of the VR audio, and the specific way of determining the total order of the MOA signal will not be repeated here.

At operation 16024, the transmitting terminal of the VR audio determines a final order of the MOA signal according to the received order of the MOA signal.

Wherein, the operation 16024 comprises operation 16024b1 or operation 16024b2, wherein:

At operation 16024b1, the transmitting terminal of the VR audio determines the received order of the MOA signal as a final order of the MOA signal.

At operation 16024b2, the transmitting terminal of the VR audio determines a final order of the MOA signal according to the received order of the MOA signal and the related information of the VR audio.

The transmitting terminal of the VR audio can determine a final order of the MOA signal according to at least one other related information, rather than the playback environment noise and the information about the number of virtual loudspeakers, in the related information of the VR audio.

In this embodiment of the disclosure, although the bandwidth occupancy in the MOA technology is somewhat reduced in comparison with the ambisonics technology, the bandwidth of the MOA technology is still too high in a real-time online browsing scenario. In this embodiment of the disclosure, the order of the MOA signal can be adjusted according to the content-related information, playback-related information and transmission-related information of the VR audio, so that the bandwidth occupancy can be reduced and/or the spatial resolution can be improved.

Embodiment 12

As another possible implementation of the various embodiments of the disclosure, based on the Embodiment 9, operations 1603 to 1604 are further included, wherein:

At operation 1603, the transmitting terminal of the VR audio determines, according to the current network state, an order required to be transmitted in advance in the ambisonics signal at a preset moment.

In this embodiment of the disclosure, the transmitting terminal of the VR audio decides, according to the current network state, an order to be transmitted in advance in the ambisonics signal at a future moment d, wherein a higher order to be transmitted in advance is allocated when the network state is good; or otherwise, the order to be to transmitted in advance is decreased.

At operation 1604, the transmitting terminal of the VR audio extracts, according to the determined order to be transmitted in advance in the ambisonics signal at the preset moment, a signal from the ambisonics signal at the preset moment in a sequence from a high order to a low order and according to the determined order required to be transmitted in advance.

In this embodiment of the disclosure, the transmitting terminal of the VR audio extracts, according to the determined order required to be transmitted in advance in the ambisonics signal at the preset moment, a low-order signal from the ambisonics signal at the preset moment, and transmits the extracted low-order signal to the receiving terminal of the VR audio.

Wherein, the low-order refers to the order to be transmitted in advance, and this order is lower than the order of the original ambisonics signal. For example, if the order of the original ambisonics signal is 3-order, 0-order to 2-order belong to a low order. The specific numerical value M of the low-order is related to the available bandwidth. If the available bandwidth is higher, the value of M is larger.

Figure 22:
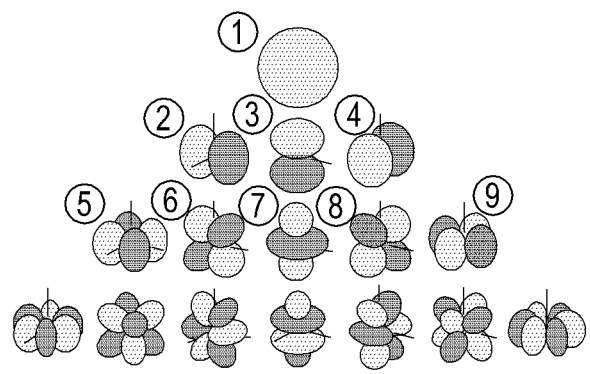
FIG. 22 is a schematic diagram of extracting low-order signals according to an embodiment of the disclosure.

FIG. 22 is a schematic diagram of extracting low-order signals according to an embodiment of the disclosure.

In this embodiment of the disclosure, the transmitting terminal of the VR audio extracts a low-order signal from the ambisonic signal at the moment d, and transmits the extracted low-order signal to the receiving terminal of the VR audio. Wherein, the method for extracting a low-order signal is shown in FIG. 22: extracting, from 3-order ambisonic signals, signals 1, 2, 3, 4, 5, 6, 7, 8 and 9 as low-order (2-order) ambisonic signals to be transmitted in advance.

At operation 1605, the transmitting terminal of the VR audio transmits the extracted signal to the receiving terminal of the VR audio.

At operation 1606, when the preset moment arrives, the transmitting terminal of the VR audio transmits a residual signal rather than the extracted signal in the MOA signal at the preset moment to the receiving terminal of the VR audio.

Wherein, the preset moment is the moment d mentioned above.

In this embodiment of the disclosure, when the preset moment arrives, the transmitting terminal of the VR audio can rotate, according to the final ambisonics signal rotation angle, the MOA signal at the preset moment, then extract a residual signal rather than the extracted signal, and transmit the residual signal and the final ambisonics signal rotation angle to the receiving terminal of the VR audio; or, when the preset moment arrives, the transmitting terminal of the VR audio extracts a residual signal rather than the extracted signal, and transmits the residual signal to the receiving terminal of the VR audio.

In this embodiment of the disclosure, when the preset moment arrives, according to at least one of the correlation information of the current ambisonics signal in the first direction and the second direction, the sound source energy of the current ambisonics signal in the first direction and the sound source energy of the current ambisonics signal in the second direction, the current environment noise energy, the content type information of the current ambisonics signal, the current network delay information, the current network bandwidth information and the current environment noise energy information, and the number of virtual loudspeakers, the transmitting terminal of the VR audio adjusts the order of the current MOA signal in the first direction and the order of the current MOA signal in the second direction. The specific way of adjusting the order of the MOA signal in the first direction and the order of the MOA signal in the second direction refers to the various embodiments described above in detail, and will not be repeated here.

In this embodiment of the disclosure, the transmitting terminal of the VR audio transmits, to the receiving terminal of the VR audio, the residual signal in the extracted MOA signal, not including the low-order signal to be transmitted in advance.

Figure 23:
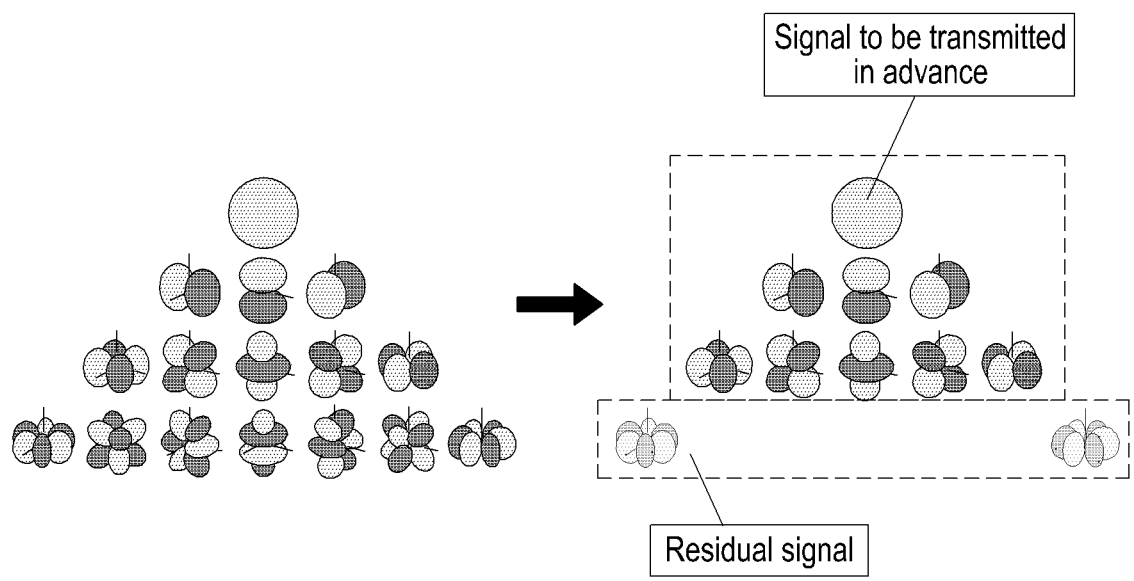
FIG. 23 is a schematic diagram of combining residual signals and signals to be transmitted in advance into MOA signals according to an embodiment of the disclosure.

FIG. 23 is a schematic diagram of combining residual signals and signals to be transmitted in advance into MOA signals according to an embodiment of the disclosure.

For example, if the signal to be transmitted in advance is a 2-order signal and the extracted MOA signal is 3-order in the horizontal direction and 2-order in the vertical direction, the residual signal is shown in FIG. 23.

At operation 1607, when the preset moment arrives, the receiving terminal of the VR audio combines the signal to be transmitted in advance with the residual signal.

In this embodiment of the disclosure, if the receiving terminal of the VR audio receives the final ambisonics signal rotation angle at the preset moment in addition to the residual signal transmitted by the transmitting terminal of the VR audio, the previously received low-order ambisonics signal at the preset moment is rotated according to the final ambisonics signal rotation angle, and the rotated low-order ambisonics signal at the preset moment is combined with the residual signal; and, if the receiving terminal of the VR audio receives only the residual signal rather than the signal required to be transmitted in advance in the MOA signal at the preset moment, the signal to be transmitted in advance is directly combined with the residual signal.

In this embodiment of the disclosure, when the preset moment arrives, the transmitting terminal of the VR audio rotates the ambisonics signal at the preset moment according to the final ambisonics signal rotation angle, and extracts the MOA signal from the rotated ambisonics signal according to the determined order in the first direction and/or the order in the second direction. In this embodiment of the disclosure, the way of determining the order in the first direction and/or the order in the second direction is the same as that in the various embodiments described above, and will not be repeated here.

In this embodiment of the disclosure, since the MOA technology cannot ensure that the receiving terminal receives stable audio signals in a case of unstable network, the transmitting terminal of the VR audio transmits in advance a low-order signal in an MOA signal at a preset moment to the receiving terminal of the VR audio according to the network state; and when the preset moment arrives, the transmitting terminal of the VR audio transmits a residual signal rather than the transmitted low-order signal to the receiving terminal of the VR audio. In other words, when the network state is good, a low-order signal is extracted from the ambisonics signal and then transmitted to the receiving terminal of the VR audio, so that it is ensured that the client can acquire stable audio signals in the case of unstable network.

Figure 24:
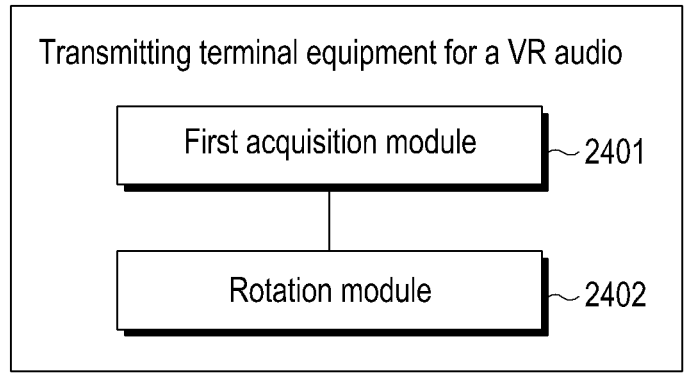
FIG. 24 is a device structure diagram of a transmitting terminal equipment for an VR audio according to an embodiment of the disclosure.

FIG. 24 is a device structure diagram of a transmitting terminal equipment for a VR audio according to an embodiment of the disclosure.

An embodiment of the disclosure provides a transmitting terminal equipment for a VR audio. As shown in FIG. 24, the transmitting terminal equipment for a VR audio comprises a first acquisition module 2401 (e.g., an acquisition device) and a rotation module 2402 (e.g., a rotation device).

The first acquisition module 2401 is configured to acquire an ambisonics signal rotation angle.

Wherein, the ambisonics signal rotation angle is determined according to a first equipment rotation angle corresponding to a receiving terminal of the VR audio.

The rotation module 2402 is configured to rotate an ambisonics signal according to the ambisonics signal rotation angle.

Compared with the prior art, in the transmitting terminal equipment for processing a VR audio provided in this embodiment of the disclosure, an ambisonics signal rotation angle can be determined according to a change of the equipment rotation angle corresponding to a receiving terminal of the VR audio, and an ambisonics can be then rotated, so that a terminal equipment playing VR audio contents or a terminal equipment playing corresponding VR video contents can still have a very high spatial audio resolution when it is not placed horizontally.

Figure 25:
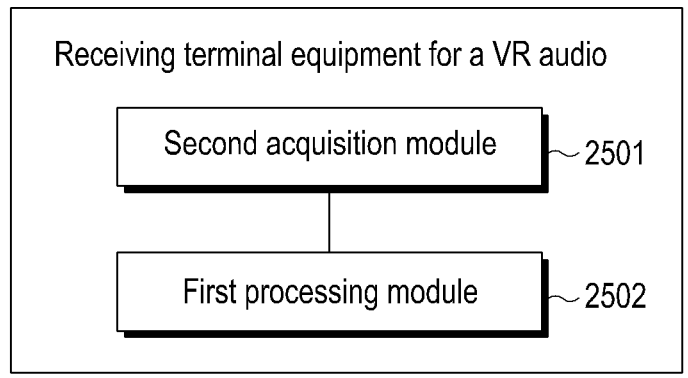
FIG. 25 is a device structure diagram of a receiving terminal equipment for an VR audio according to an embodiment of the disclosure.

FIG. 25 is a device structure diagram of a receiving terminal equipment for a VR audio according to an embodiment of the disclosure.

An embodiment of the disclosure provides a receiving terminal equipment for a VR audio. As shown in FIG. 25, the receiving terminal equipment for a VR audio comprises a second acquisition module 2501 and a first processing module 2502 (e.g., at least one processor).

The second acquisition module 2501 is configured to acquire a corresponding first equipment rotation angle.

The first processing module 2502 is configured to transmit the acquired first equipment rotation angle to a transmitting terminal of a VR audio, and/or predict a second equipment rotation angle according to the first equipment rotation angle and current network delay information and transmit the second equipment rotation angle to the transmitting terminal of the VR audio.

Compared with the prior art, in the receiving terminal equipment for processing a VR audio provided in this embodiment of the disclosure, an ambisonics signal rotation angle can be determined according to a change in the equipment rotation angle corresponding to a receiving terminal of the VR audio, and an ambisonics can be then rotated, so that a terminal equipment playing VR audio contents or a terminal equipment playing corresponding VR video contents can still have a very high spatial audio resolution when it is not placed horizontally.

Figure 26:
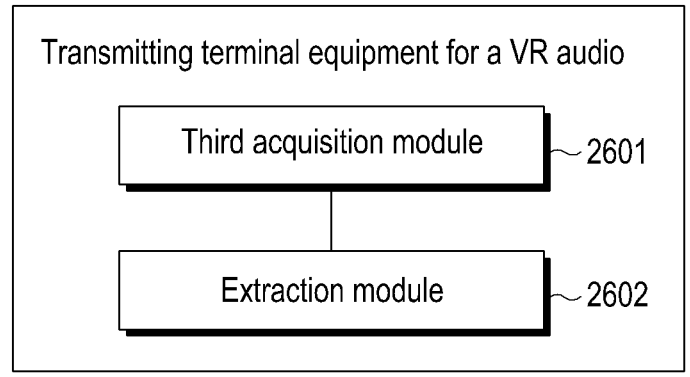
FIG. 26 is a device structure diagram of another transmitting terminal equipment for an VR audio according to an embodiment of the disclosure.

FIG. 26 is a device structure diagram of another transmitting terminal equipment for a VR audio according to an embodiment of the disclosure.

An embodiment of the disclosure provides another transmitting terminal equipment for a VR audio. As shown in FIG. 26, the transmitting terminal equipment for a VR audio comprises a third acquisition module 2601 and an extraction module 2602 (e.g., an extractor).

The third acquisition module 2601 is configured to acquire an order of a mixed-order ambisonics (MOA) signal determined according to related information of the VR audio.

Wherein, the related information comprises at least one of the following: content-related information of the VR audio, playback-related information of the VR audio, and transmission-related information of the VR audio.

The extraction module 2602 is configured to extract an MOA signal from an ambisonics signal according to the order of the MOA signal.

In the transmitting terminal equipment for processing a VR audio provided in this embodiment of the disclosure, compared with the prior art, an order of an MOA signal determined according to related information of the VR audio can be acquired, and an MOA signal is then extracted according to the order of the MOA signal, so that the accuracy of the spatial resolution can be improved and/or the bandwidth occupancy can be reduced.

Figure 27:
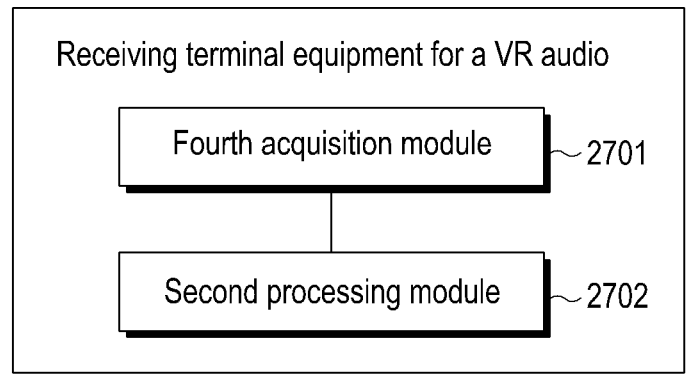
FIG. 27 is a device structure diagram of another receiving terminal equipment for a VR audio according to an embodiment of the disclosure.

FIG. 27 is a device structure diagram of another receiving terminal equipment for a VR audio according to an embodiment of the disclosure.

An embodiment of the disclosure provides another receiving terminal equipment for a VR audio. Referring to FIG. 27, the receiving terminal equipment for a VR audio comprises a fourth acquisition module 2701 and a second processing module 2702 (e.g., at least one processor).

The fourth acquisition module 2701 is configured to acquire related information of a VR audio.

Wherein, the related information comprises at least one of the following: content-related information of the VR audio, playback-related information of the VR audio and transmission-related information of the VR audio.

The second processing module 2702 is configured to transmit the acquired related information of the VR audio to a transmitting terminal of the VR audio, or determine an order of an MOA signal according to the acquired related information of the VR audio and transmit the determined order of the MOA signal to the transmitting terminal of the VR audio.

In the receiving terminal equipment for processing a VR audio provided in this embodiment of the disclosure, compared with the prior art, an order of an MOA signal determined according to related information of the VR audio can be acquired, and an MOA signal is then extracted according to the order of the MOA signal, so that the accuracy of the spatial resolution can be improved and/or the bandwidth occupancy can be reduced.

The transmitting terminal of the VR audio and the receiving terminal of the VR audio provided in the various embodiments of the disclosure are used for implementing the method embodiments described above, and the specific function implementations refer to the descriptions in the method embodiments and will not be repeated here. The method for processing a VR audio and the corresponding equipment provided in the various embodiments of the disclosure can be used to rotate the current ambisonics signal according to the rotation angle of the current gazing plane of the user and then extract an MOA signal from the rotated ambisonics signal according to the determined order of the MOA signal. However, the applications of the method for processing a VR audio and the corresponding equipment are not limited thereto.

It should be understood by those skilled in the art that the disclosure involves devices for carrying out one or more of operations as described in the disclosure. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, compact disc red-only memory (CD-ROM) and magneto optical disks), ROM, random access memory (RAM), erasable programmable ROM (EPROM), electrically erasable programmable ROM (EEPROM), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the steps, measures and solutions in the operations, methods and flows already discussed in the disclosure may be alternated, changed, combined or deleted. Further, other steps, measures and solutions in the operations, methods and flows already discussed in the disclosure can also be alternated, changed, rearranged, decomposed, combined or deleted. Further, the steps, measures and solutions of the prior art in the operations, methods and operations disclosed in the disclosure can also be alternated, changed, rearranged, decomposed, combined or deleted.

While the disclosure has been shown and described with reference to various embodiments thereof, it will be understood by those skilled in the art that various changes in form and details maybe made therein without departing from the spirit and scope of the disclosure as defined by the appended claims and their equivalents.

What is claimed is:

1. A method for processing a virtual reality (VR) audio comprising:
   acquiring, by a transmitting terminal of a VR audio, an ambisonics signal rotation angle which is determined based on a first equipment rotation angle corresponding to a receiving terminal of the VR audio;
   rotating, by the transmitting terminal of the VR audio, an ambisonics signal according to the acquired ambisonics signal rotation angle; and
   transmitting, by the transmitting terminal of the VR audio, the rotated ambisonics signal to the receiving terminal of the VR audio,
   wherein the acquiring of the ambisonics signal rotation angle comprises receiving, by the transmitting terminal of the VR audio, a first equipment rotation angle transmitted by the receiving terminal of the VR audio and a second equipment rotation angle predicted according to current network delay information, predicting a second equipment rotation angle according to the received first equipment rotation angle and the current network delay information, and determining an ambisonics signal rotation angle according to the received second equipment rotation angle and the second equipment rotation angle predicted by the transmitting terminal.

2. The method of claim 1,
   wherein the second equipment rotation angle received by the transmitting terminal is synthesized by the receiving terminal according to a weight corresponding to the predicted second equipment rotation angle and a weight corresponding to the first equipment rotation angle, respectively,
   wherein the determining of the ambisonics signal rotation angle according to the predicted second equipment rotation angle comprises:
   performing, by the transmitting terminal, synthesis according to the weight corresponding to the predicted second equipment rotation angle and the weight corresponding to the first equipment rotation angle, and determining an ambisonics signal rotation angle according to the synthesized second equipment rotation angle, and wherein the determining of the ambisonics signal rotation angle according to the received second equipment rotation angle and the second equipment rotation angle predicted by the transmitting terminal comprises:

performing, by the transmitting terminal, synthesis according to the weight corresponding to the second equipment rotation angle predicted by the transmitting terminal and the weight corresponding to the received first equipment rotation angle, and determining an ambisonics signal rotation angle according to the received second equipment rotation angle and the synthesized second equipment rotation angle.

3. The method of claim 1, wherein the determining of the ambisonics signal rotation angle according to the received second equipment rotation angle and the second equipment rotation angle predicted by the transmitting terminal comprises:

determining, by the transmitting terminal, an ambisonics signal rotation angle according to at least one of the following information:

a transmission situation of the second equipment rotation angle between the transmitting terminal and the receiving terminal, a transmission situation of the first equipment rotation angle between the transmitting terminal and the receiving terminal, a network condition between the transmitting terminal and the receiving terminal, or the processing capacity of the transmitting terminal and/or the receiving terminal.

4. The method of claim 1, further comprising:

acquiring, by the transmitting terminal of the VR audio, an order of a mixed order ambisonics (MOA) signal determined according to related information of the VR audio, the related information comprising at least one of content-related information of the VR audio, playback-related information of the VR audio, or transmission-related information of the VR audio; and extracting, by the transmitting terminal of the VR audio, an MOA signal from the rotated ambisonics signal according to the order of the MOA signal.

5. The method of claim 4, wherein the content-related information of the VR audio comprises at least one of content correlation information, sound source direction information or VR content type information, wherein the playback-related information of the VR audio comprises playback environment noise information and information about the number of virtual loudspeakers in the receiving terminal, and wherein the transmission-related information of the VR audio comprises at least one of transmission network bandwidth information or transmission network delay information.

6. The method of claim 5, wherein the acquiring of the order of the MOA signal determined according to the related information of the VR audio comprises:

determining, by the transmitting terminal of the VR audio, a total order of the MOA signal according to at least one of the VR content type information, the transmission network bandwidth information, the transmission network delay information, the playback environment noise information or the information about the number of virtual loudspeakers of the receiving terminal, or determining, according to at least one of the content correlation information of the VR audio and the sound source direction information of VR audio contents, an order of the MOA signal in a first direction and/or a second direction.

7. The method of claim 4, wherein the acquiring of the order of the MOA signal determined according to related information of the VR audio comprises:

receiving, by the transmitting terminal of the VR audio, an order of the MOA signal determined according to the related information of the VR audio by the receiving terminal of the VR audio, and determining a final order of the MOA signal according to the received order of the MOA signal.

8. The method of claim 4, further comprising:

determining, by the transmitting terminal of the VR audio and according to the current network state, an order required to be transmitted in advance in the ambisonics signal at a preset moment;

extracting, by the transmitting terminal of the VR audio and according to the determined order required to be transmitted in advance in the ambisonics signal at the preset moment, a signal from the ambisonics signal at the preset moment in a sequence from a low order to a high order and according to an extracted signal of the determined order required to be transmitted in advance, and transmitting the extracted signal to the receiving terminal of the VR audio; and when the preset moment arrives, transmitting a residual signal rather than the extracted signal in the MOA signal at the preset moment to the receiving terminal of the VR audio.

9. A transmitting terminal equipment for a virtual reality (VR) audio, comprising:

a transceiver; and at least one processor coupled to the transceiver, wherein the at least one processor is configured to:

acquire an ambisonics signal rotation angle, the ambisonics signal rotation angle being determined based on a first equipment rotation angle corresponding to a receiving terminal of the VR audio, rotate an ambisonics signal according to the ambisonics signal rotation angle, and transmit the rotated ambisonics signal to the receiving terminal of the VR audio, wherein the at least one processor is configured to acquire the ambisonics signal rotation angle based on receiving a first equipment rotation angle transmitted by the receiving terminal of the VR audio and a second equipment rotation angle predicted according to current network delay information, predicting a second equipment rotation angle according to the received first equipment rotation angle and the current network delay information, and determining an ambisonics signal rotation angle according to the received second equipment rotation angle and the second equipment rotation angle predicted by the transmitting terminal.

10. A method for processing a virtual reality (VR) audio, the method comprising:

acquiring, by a receiving terminal of a VR audio, a first equipment rotation angle corresponding to the receiving terminal;

transmitting, by the receiving terminal of the VR audio, at least one of the acquired first equipment rotation angle and a second equipment rotation angle which is predicted based on the first equipment rotation angle and network delay information, to a transmitting terminal of the VR audio; and receiving an ambisonics signal which is rotated based on at least one of the first equipment rotation angle and the second equipment rotation angle, from the transmitting terminal of the VR audio.

11. The method of claim 10, wherein the second equipment rotation angle is synthesized according to a weight corresponding to the second equipment rotation angle and a weight corresponding to the first equipment rotation angle for transmitting to the transmitting terminal of the VR audio.

12. The method of claim 10, further comprising:
acquiring, by the receiving terminal of the VR audio, related information of the VR audio, the related information comprising at least one of content-related information of the VR audio, playback-related information of the VR audio, or transmission-related information of the VR audio; and
transmitting, by the receiving terminal of the VR audio, the acquired related information of the VR audio to the transmitting terminal of the VR audio, or determining an order of a mixed-order ambisonics (MOA) signal according to the acquired related information of the VR audio and transmitting the determined order of the MOA signal to the transmitting terminal of the VR audio.

13. The method of claim 12, further comprising:
receiving, by the receiving terminal of the VR audio, a signal required to be transmitted in advance in an ambisonics signal at a preset moment transmitted by the transmitting terminal; and
when the preset moment arrives, receiving a residual signal rather than the signal required to be transmitted in advance in the MOA signal at the preset moment, and combining the signal required to be transmitted in advance with the residual signal.

14. The method of claim 12, further comprising:
adjusting, according to at least one of the current gazing direction of a user, the current battery level of the receiving terminal of the VR audio, and the computation capability of the receiving terminal of the VR audio, the number of virtual loudspeakers in the receiving terminal.

15. A receiving terminal equipment for a virtual reality (VR) audio comprising:
a transceiver; and
at least one processor coupled to the transceiver, wherein the at least one processor is configured to:
acquire a first equipment rotation angle corresponding to the receiving terminal,
transmit at least one of the acquired first equipment rotation angle and a second equipment rotation angle which is predicted based on the first equipment rotation angle and network delay information, to a transmitting terminal of a VR audio, and
receive an ambisonics signal which is rotated based on at least one of the first equipment rotation angle and the second equipment rotation angle, from the transmitting terminal of the VR audio.

* * * * *